United States Patent
Srinivasan et al.

(10) Patent No.: US 9,606,778 B2
(45) Date of Patent: Mar. 28, 2017

(54) SYSTEM AND METHOD FOR META-DATA DRIVEN, SEMI-AUTOMATED GENERATION OF WEB SERVICES BASED ON EXISTING APPLICATIONS

(71) Applicant: ORACLE INTERNATIONAL CORPORATION, Redwood Shores, CA (US)

(72) Inventors: Nagaraj Srinivasan, Union City, CA (US); Ananthalakshmi Anbuselvan, San Mateo, CA (US); Keshava Rangarajan, Foster City, CA (US); Sudharsan Krishnamurthy, Newark, CA (US); Murari Sinha, Foster City, CA (US); Yuling Chen, San Francisco, CA (US); Aditya Ramamurthy Rao, Karnataka (IN); Jayateja Dasararaju, Andhra Pradesh (IN); Harish Gupta, Delhi (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 201 days.

(21) Appl. No.: 14/313,514

(22) Filed: Jun. 24, 2014

(65) Prior Publication Data
US 2014/0310686 A1    Oct. 16, 2014

Related U.S. Application Data

(63) Continuation of application No. 12/487,004, filed on Jun. 18, 2009, now Pat. No. 8,799,319.

(Continued)

(51) Int. Cl.
G06F 17/30       (2006.01)
G06F 9/44        (2006.01)
G06F 9/54        (2006.01)

(52) U.S. Cl.
CPC .................. *G06F 8/36* (2013.01); *G06F 8/72* (2013.01); *G06F 9/541* (2013.01); *G06F 17/30893* (2013.01)

(58) Field of Classification Search
None
See application file for complete search history.

(56) References Cited

U.S. PATENT DOCUMENTS 4,595,981 A    6/1986  Leung
5,659,754 A    8/1997  Grove et al.
(Continued)

OTHER PUBLICATIONS

Belushi et al., "An approach to wrap legacy applications into web services," IEE International Conference on Service Systems and Service Management, Issue Date: Jun. 9-11, 2007.*
(Continued)

*Primary Examiner* — Jay Morrison
(74) *Attorney, Agent, or Firm* — Kilpatrick Townsend & Stockton LLP

(57) ABSTRACT

Techniques for reusing logic implemented in an existing software application such that the logic can be exposed as a Web service or in any other service-oriented context. In one set of embodiments, a design-time technique is provided that comprises, inter alia, receiving program code for an existing software application, generating metadata based on the program code, and customizing the metadata to align with an intended Web service. Artifacts for the Web service are then generated based on the customized metadata. In another set of embodiments, a run-time technique is provided that comprises, inter alia, receiving a payload representing an invocation of a Web service operation of the generated Web (Continued)

service, processing the payload, and, based on the processing, causing the existing software application to execute an operation in response to the invocation of the Web service operation.

20 Claims, 10 Drawing Sheets

Related U.S. Application Data

(60) Provisional application No. 61/098,571, filed on Sep. 19, 2008.

(56) References Cited

U.S. PATENT DOCUMENTS

| | | | |
|---|---|---|---|
| 5,790,778 A | 8/1998 | Bush et al. | |
| 5,850,518 A | 12/1998 | Northrup | |
| 5,946,492 A | 8/1999 | Bates | |
| 6,047,332 A | 4/2000 | Viswanathan et al. | |
| 6,078,745 A | 6/2000 | De et al. | |
| 6,117,180 A | 9/2000 | Dave et al. | |
| 6,138,270 A | 10/2000 | Hsu | |
| 6,154,877 A | 11/2000 | Ramkumar et al. | |
| 6,161,219 A | 12/2000 | Ramkumar et al. | |
| 6,397,254 B1 | 5/2002 | Northrup | |
| 6,401,134 B1 | 6/2002 | Razavi et al. | |
| 6,421,705 B1 | 7/2002 | Northrup | |
| 6,442,751 B1 | 8/2002 | Cocchi et al. | |
| 6,487,713 B1 | 11/2002 | Cohen et al. | |
| 6,546,413 B1 | 4/2003 | Northrup | |
| 6,601,233 B1 | 7/2003 | Underwood | |
| 6,641,746 B2 | 11/2003 | Houge et al. | |
| 6,671,713 B2 | 12/2003 | Northrup | |
| 6,671,746 B1 | 12/2003 | Northrup | |
| 6,779,000 B1 | 8/2004 | Northrup | |
| 6,807,636 B2 | 10/2004 | Hartman et al. | |
| 6,901,580 B2 | 5/2005 | Iwanojko et al. | |
| 6,922,675 B1 | 7/2005 | Chatterjee et al. | |
| 6,922,705 B1 | 7/2005 | Northrup | |
| 6,947,992 B1 | 9/2005 | Shachor | |
| 6,954,792 B2 | 10/2005 | Kang et al. | |
| 6,973,460 B1 | 12/2005 | Mitra | |
| 6,990,532 B2 | 1/2006 | Day et al. | |
| 7,028,019 B2 | 4/2006 | McMillan et al. | |
| 7,062,749 B2 | 6/2006 | Cyr et al. | |
| 7,086,009 B2 | 8/2006 | Resnick et al. | |
| 7,117,216 B2 | 10/2006 | Chakraborty et al. | |
| 7,146,607 B2 | 12/2006 | Nair et al. | |
| 7,177,878 B2 | 2/2007 | Wason | |
| 7,188,158 B1 | 3/2007 | Stanton et al. | |
| 7,203,938 B2 | 4/2007 | Ambrose et al. | |
| 7,263,686 B2 | 8/2007 | Sadiq | |
| 7,343,360 B1 | 3/2008 | Ristanovic et al. | |
| 7,349,913 B2 | 3/2008 | Clark et al. | |
| 7,505,990 B2 | 3/2009 | Krishna et al. | |
| 7,535,927 B1 | 5/2009 | Northrup | |
| 7,536,606 B2 | 5/2009 | Andrews et al. | |
| 7,555,712 B2 | 6/2009 | Croft et al. | |
| 7,584,207 B2 | 9/2009 | Mortensen et al. | |
| 7,590,644 B2 | 9/2009 | Matsakis et al. | |
| 7,603,674 B2 | 10/2009 | Cyr et al. | |
| 7,644,262 B1 | 1/2010 | Bromley et al. | |
| 7,680,752 B1 | 3/2010 | Clune, III et al. | |
| 7,685,604 B2 | 3/2010 | Baartman et al. | |
| 7,693,851 B2 | 4/2010 | Becker | |
| 7,721,158 B2 | 5/2010 | Lee | |
| 7,774,477 B2 | 8/2010 | Zintel | |
| 7,783,782 B2 | 8/2010 | Cromp et al. | |
| 7,788,338 B2 | 8/2010 | Savchenko et al. | |
| 7,793,340 B2 | 9/2010 | Kiester et al. | |
| 7,827,494 B1 | 11/2010 | Hedayatpour et al. | |
| 7,840,941 B2 | 11/2010 | Brookins et al. | |
| 7,853,899 B1 | 12/2010 | Damaschke et al. | |
| 7,865,544 B2 | 1/2011 | Kordun et al. | |
| 7,895,512 B2 | 2/2011 | Roberts | |
| 7,908,162 B2 | 3/2011 | Jennings | |
| 7,933,946 B2 | 4/2011 | Livshits et al. | |
| 7,945,907 B2 | 5/2011 | Dreiling et al. | |
| 7,950,424 B2 | 5/2011 | Ozanne et al. | |
| 7,954,111 B2 | 5/2011 | Waguet | |
| 7,984,424 B2 | 7/2011 | Dengler et al. | |
| 7,992,130 B2 | 8/2011 | Bozza et al. | |
| 8,015,545 B2 | 9/2011 | Seto et al. | |
| 8,032,390 B2 | 10/2011 | Waguet | |
| 8,065,668 B2 | 11/2011 | Bosworth et al. | |
| 8,074,214 B2 | 12/2011 | Isaacson et al. | |
| 8,108,825 B2 | 1/2012 | Goodwin et al. | |
| 8,122,292 B2 | 2/2012 | Nanjundaswamy | |
| 8,141,064 B2 | 3/2012 | Chipman | |
| 8,166,450 B2 | 4/2012 | Fuhler et al. | |
| 8,196,125 B2 | 6/2012 | Maes | |
| 8,209,672 B2 | 6/2012 | Ivanov | |
| 8,209,675 B2 | 6/2012 | Zhao et al. | |
| 8,271,609 B2 | 9/2012 | Addala et al. | |
| 8,332,654 B2 | 12/2012 | Anbuselvan | |
| 8,375,362 B1* | 2/2013 | Brette | G06F 8/30 717/121 |
| 8,423,973 B2 | 4/2013 | Saunders et al. | |
| 8,494,832 B2 | 7/2013 | Krishnan et al. | |
| 8,538,998 B2 | 9/2013 | Barrow | |
| 8,555,266 B2 | 10/2013 | Copeland et al. | |
| 8,560,938 B2 | 10/2013 | Barrow et al. | |
| 8,561,089 B2 | 10/2013 | Leff et al. | |
| 8,601,454 B2 | 12/2013 | Christophe | |
| 8,667,031 B2 | 3/2014 | Konduri et al. | |
| 8,782,604 B2 | 7/2014 | Konduri et al. | |
| 8,788,542 B2 | 7/2014 | Barrow | |
| 8,799,319 B2 | 8/2014 | Srinivasan et al. | |
| 8,856,658 B2 | 10/2014 | Brosh et al. | |
| 8,856,737 B2 | 10/2014 | Kand et al. | |
| 8,869,108 B2 | 10/2014 | Utschig-Utschig et al. | |
| 8,875,306 B2 | 10/2014 | Lowes | |
| 8,954,942 B2 | 2/2015 | Krishnamurthy | |
| 8,966,465 B2 | 2/2015 | Konduri | |
| 8,996,658 B2 | 3/2015 | Anbuselvan | |
| 9,122,520 B2 | 9/2015 | Addala et al. | |
| 2002/0013938 A1 | 1/2002 | Duesterwald et al. | |
| 2002/0023140 A1 | 2/2002 | Hile et al. | |
| 2002/0103660 A1 | 8/2002 | Cramon et al. | |
| 2002/0129060 A1 | 9/2002 | Rollins et al. | |
| 2002/0133515 A1 | 9/2002 | Kagle et al. | |
| 2002/0143735 A1 | 10/2002 | Ayi et al. | |
| 2002/0147757 A1 | 10/2002 | Day et al. | |
| 2002/0188613 A1 | 12/2002 | Chakraborty et al. | |
| 2003/0005117 A1 | 1/2003 | Kang et al. | |
| 2003/0023587 A1 | 1/2003 | Dennis et al. | |
| 2003/0025732 A1 | 2/2003 | Prichard | |
| 2003/0033310 A1 | 2/2003 | Factor et al. | |
| 2003/0034989 A1 | 2/2003 | Kondo | |
| 2003/0074653 A1 | 4/2003 | Ju et al. | |
| 2003/0084424 A1 | 5/2003 | Reddy et al. | |
| 2003/0088857 A1 | 5/2003 | Balva et al. | |
| 2003/0172127 A1 | 9/2003 | Northrup et al. | |
| 2003/0172168 A1 | 9/2003 | Mak et al. | |
| 2003/0172193 A1 | 9/2003 | Olsen | |
| 2003/0192031 A1 | 10/2003 | Srinivasan et al. | |
| 2003/0204518 A1 | 10/2003 | Lang et al. | |
| 2003/0204645 A1 | 10/2003 | Sharma et al. | |
| 2003/0233631 A1 | 12/2003 | Curry et al. | |
| 2003/0233642 A1 | 12/2003 | Hank | |
| 2004/0046787 A1 | 3/2004 | Henry et al. | |
| 2004/0046789 A1 | 3/2004 | Inanoria | |
| 2004/0054991 A1 | 3/2004 | Harres | |
| 2004/0073565 A1 | 4/2004 | Kaufman et al. | |
| 2004/0078424 A1 | 4/2004 | Yairi et al. | |
| 2004/0111533 A1 | 6/2004 | Beisiegel et al. | |
| 2004/0111673 A1 | 6/2004 | Bowman et al. | |
| 2004/0148588 A1 | 7/2004 | Sadiq | |
| 2004/0181534 A1 | 9/2004 | Mortensen et al. | |
| 2004/0194016 A1 | 9/2004 | Liggitt | |
| 2004/0205117 A1 | 10/2004 | Hertling et al. | |
| 2004/0205765 A1 | 10/2004 | Beringer et al. | |
| 2004/0216094 A1 | 10/2004 | Bosworth et al. | |

(56) References Cited

U.S. PATENT DOCUMENTS

| | | |
|---|---|---|
| 2004/0230639 A1 | 11/2004 | Soluk et al. |
| 2004/0261066 A1 | 12/2004 | Ringseth et al. |
| 2005/0044197 A1* | 2/2005 | Lai .................... G06Q 10/10 709/223 |
| 2005/0050527 A1 | 3/2005 | McCrady et al. |
| 2005/0091639 A1 | 4/2005 | Patel |
| 2005/0097503 A1 | 5/2005 | Zintel et al. |
| 2005/0183074 A1 | 8/2005 | Alexander et al. |
| 2005/0193061 A1 | 9/2005 | Schmidt et al. |
| 2005/0223361 A1 | 10/2005 | Belbute |
| 2005/0240858 A1 | 10/2005 | Croft et al. |
| 2005/0251788 A1 | 11/2005 | Henke et al. |
| 2005/0273772 A1 | 12/2005 | Matsakis et al. |
| 2006/0010163 A1 | 1/2006 | Herzog et al. |
| 2006/0015847 A1 | 1/2006 | Carroll et al. |
| 2006/0031264 A1 | 2/2006 | Bosworth et al. |
| 2006/0031750 A1 | 2/2006 | Waldorf et al. |
| 2006/0036463 A1 | 2/2006 | Patrick et al. |
| 2006/0075387 A1 | 4/2006 | Martin et al. |
| 2006/0080117 A1 | 4/2006 | Carr et al. |
| 2006/0101038 A1 | 5/2006 | Gabriel et al. |
| 2006/0106626 A1 | 5/2006 | Jeng et al. |
| 2006/0117073 A1 | 6/2006 | Bosworth et al. |
| 2006/0130047 A1 | 6/2006 | Burugapalli |
| 2006/0136832 A1 | 6/2006 | Keller et al. |
| 2006/0143229 A1 | 6/2006 | Bou-ghannam et al. |
| 2006/0150156 A1 | 7/2006 | Cyr et al. |
| 2006/0165105 A1 | 7/2006 | Shenfield et al. |
| 2006/0168115 A1* | 7/2006 | Loupia .................... G06F 8/38 709/218 |
| 2006/0168132 A1 | 7/2006 | Bunter et al. |
| 2006/0168355 A1 | 7/2006 | Shenfield et al. |
| 2006/0168557 A1 | 7/2006 | Agrawal et al. |
| 2006/0184866 A1 | 8/2006 | Rees |
| 2006/0206858 A1 | 9/2006 | Becker et al. |
| 2006/0235733 A1 | 10/2006 | Marks |
| 2006/0235986 A1 | 10/2006 | Kim |
| 2006/0242636 A1 | 10/2006 | Chilimbi et al. |
| 2006/0253490 A1 | 11/2006 | Krishna et al. |
| 2006/0253586 A1* | 11/2006 | Woods ............... G06F 17/30867 709/226 |
| 2006/0265702 A1 | 11/2006 | Isaacson et al. |
| 2006/0271537 A1 | 11/2006 | Chandrasekharan et al. |
| 2006/0277542 A1 | 12/2006 | Wipfel |
| 2006/0282767 A1 | 12/2006 | Suryanarayana et al. |
| 2006/0294474 A1 | 12/2006 | Taylor et al. |
| 2006/0294506 A1 | 12/2006 | Dengler et al. |
| 2007/0016429 A1 | 1/2007 | Bournas et al. |
| 2007/0027742 A1* | 2/2007 | Emuchay ............... G06F 9/466 705/7.27 |
| 2007/0055936 A1 | 3/2007 | Dhanjal et al. |
| 2007/0106975 A1 | 5/2007 | DeLine |
| 2007/0113191 A1 | 5/2007 | Keller et al. |
| 2007/0130205 A1 | 6/2007 | Dengler et al. |
| 2007/0157078 A1 | 7/2007 | Anderson |
| 2007/0169199 A1 | 7/2007 | Quinnell et al. |
| 2007/0174763 A1 | 7/2007 | Chang et al. |
| 2007/0174822 A1 | 7/2007 | Moser et al. |
| 2007/0203956 A1 | 8/2007 | Anderson et al. |
| 2007/0220429 A1 | 9/2007 | Kureshy et al. |
| 2007/0240096 A1 | 10/2007 | Pontoppidan et al. |
| 2007/0245340 A1 | 10/2007 | Cohen et al. |
| 2007/0260575 A1 | 11/2007 | Robinson et al. |
| 2007/0266377 A1 | 11/2007 | Ivanov |
| 2007/0271552 A1 | 11/2007 | Pulley |
| 2007/0277095 A1 | 11/2007 | Ukigawa |
| 2007/0282885 A1 | 12/2007 | Baude et al. |
| 2007/0294586 A1 | 12/2007 | Parvathy et al. |
| 2007/0294664 A1 | 12/2007 | Joshi |
| 2007/0299705 A1* | 12/2007 | Chen ............... G06F 11/3684 705/7.11 |
| 2008/0004887 A1 | 1/2008 | Brunswig et al. |
| 2008/0022257 A1 | 1/2008 | Baartman et al. |
| 2008/0028302 A1 | 1/2008 | Meschkat |
| 2008/0033988 A1* | 2/2008 | Narayan ............ G06F 17/30893 |
| 2008/0065675 A1 | 3/2008 | Bozich et al. |
| 2008/0077848 A1 | 3/2008 | Roberts |
| 2008/0083012 A1 | 4/2008 | Yu et al. |
| 2008/0104617 A1 | 5/2008 | Apacible et al. |
| 2008/0120557 A1 | 5/2008 | Offenhartz et al. |
| 2008/0120620 A1 | 5/2008 | Lett et al. |
| 2008/0126396 A1 | 5/2008 | Gagnon |
| 2008/0127087 A1 | 5/2008 | Brookins et al. |
| 2008/0127124 A1 | 5/2008 | Gilfix et al. |
| 2008/0162208 A1 | 7/2008 | Waguet |
| 2008/0162304 A1 | 7/2008 | Ourega |
| 2008/0162565 A1 | 7/2008 | Waguet |
| 2008/0163164 A1 | 7/2008 | Chowdhary et al. |
| 2008/0183479 A1 | 7/2008 | Iwashita et al. |
| 2008/0183744 A1 | 7/2008 | Adendorff et al. |
| 2008/0184201 A1 | 7/2008 | Burns et al. |
| 2008/0189358 A1 | 8/2008 | Charles |
| 2008/0189617 A1 | 8/2008 | Covell et al. |
| 2008/0196024 A1 | 8/2008 | Barfield et al. |
| 2008/0243901 A1 | 10/2008 | Super et al. |
| 2008/0250313 A1 | 10/2008 | Kamdar et al. |
| 2008/0275844 A1 | 11/2008 | Buzsaki et al. |
| 2008/0276218 A1 | 11/2008 | Taylor et al. |
| 2008/0276260 A1 | 11/2008 | Garlick et al. |
| 2008/0295109 A1 | 11/2008 | Huang et al. |
| 2008/0313648 A1 | 12/2008 | Wang et al. |
| 2008/0320246 A1 | 12/2008 | Fuhler et al. |
| 2009/0031280 A1 | 1/2009 | Koehler |
| 2009/0037896 A1* | 2/2009 | Grechanik ................ G06F 8/65 717/168 |
| 2009/0083297 A1 | 3/2009 | Pohl et al. |
| 2009/0089741 A1 | 4/2009 | Bornhoevd et al. |
| 2009/0094588 A1 | 4/2009 | Chipman |
| 2009/0106494 A1 | 4/2009 | Knebel |
| 2009/0125893 A1 | 5/2009 | Copeland et al. |
| 2009/0144716 A1 | 6/2009 | Felts |
| 2009/0144729 A1 | 6/2009 | Guizar |
| 2009/0150565 A1 | 6/2009 | Grossner et al. |
| 2009/0157859 A1 | 6/2009 | Morris |
| 2009/0158237 A1 | 6/2009 | Zhang et al. |
| 2009/0158263 A1 | 6/2009 | Christophe |
| 2009/0178020 A1 | 7/2009 | Goodwin et al. |
| 2009/0204567 A1 | 8/2009 | Barrow |
| 2009/0204629 A1 | 8/2009 | Barrow |
| 2009/0204884 A1 | 8/2009 | Barrow et al. |
| 2009/0204943 A1 | 8/2009 | Konduri |
| 2009/0205013 A1 | 8/2009 | Lowes |
| 2009/0217153 A1 | 8/2009 | Oshima et al. |
| 2009/0259993 A1 | 10/2009 | Konduri et al. |
| 2009/0292797 A1 | 11/2009 | Cromp et al. |
| 2009/0313256 A1 | 12/2009 | Konduri et al. |
| 2009/0320007 A1 | 12/2009 | Krishnaswamy et al. |
| 2010/0057482 A1 | 3/2010 | Radhakrishnan et al. |
| 2010/0057836 A1 | 3/2010 | Anbuselvan |
| 2010/0070553 A1 | 3/2010 | Addala et al. |
| 2010/0070973 A1 | 3/2010 | Addala et al. |
| 2010/0082556 A1 | 4/2010 | Srinivasan et al. |
| 2010/0131937 A1 | 5/2010 | Misra et al. |
| 2010/0132009 A1 | 5/2010 | Khemani et al. |
| 2010/0146291 A1 | 6/2010 | Anbuselvan |
| 2010/0162220 A1 | 6/2010 | Cui et al. |
| 2010/0236660 A1 | 9/2010 | Ozanne et al. |
| 2010/0313038 A1 | 12/2010 | Bradley et al. |
| 2010/0332401 A1 | 12/2010 | Prahlad et al. |
| 2010/0332454 A1 | 12/2010 | Prahlad et al. |
| 2010/0333116 A1 | 12/2010 | Prahlad et al. |
| 2011/0010692 A1 | 1/2011 | Hattori et al. |
| 2011/0023071 A1 | 1/2011 | Li et al. |
| 2011/0047415 A1 | 2/2011 | Nanjundaswamy |
| 2011/0119649 A1 | 5/2011 | Kand et al. |
| 2011/0119651 A1 | 5/2011 | Utschig-utschig et al. |
| 2011/0282829 A1 | 11/2011 | Rangaswamy et al. |
| 2012/0116980 A1 | 5/2012 | Mercuri |
| 2012/0296624 A1 | 11/2012 | Jeng et al. |
| 2013/0024424 A1 | 1/2013 | Prahlad et al. |
| 2013/0086568 A1 | 4/2013 | Krishnamurthy |

(56) References Cited

U.S. PATENT DOCUMENTS

2014/0081896 A1 3/2014 Ranganathan et al.
2014/0282602 A1 9/2014 Addala et al.

OTHER PUBLICATIONS

Soap Basics, http://web.archive.org/web/20050413022320/http://www.soapuser.com/basics1.html, archived Apr. 13, 2005.*
Liu et al., "Reengineering legacy systems with RESTful web service," 32nd Annual IEEE International Conference on Computer Software and Applications, Jul. 28-Aug. 1, 2008.*
Oracle BPEL 10g Purging Strategies, An Oracle White Paper, Oracle, Aug. 2010, 21 pages.
Oracle SOA Suite 11 g: Essential Concepts, vol. I—Student Guide, Edition 1.0, Oracle, Sep. 2010, pp. 8-18 to 8-21.
Bohn et al., WS-BPEL Process Compiler for Resource-Constrained Embedded Systems, 22nd International Conference on Advanced Information Networking and Applications, IEEE, 2008, pp. 1387-1392.
U.S. Appl. No. 12/029,724, Advisory Action mailed on Aug. 12, 2013, 2 pages.
U.S. Appl. No. 13/360,127, Notice of Allowance mailed on Nov. 4, 2014, 10 pages.
U.S. Appl. No. 12/029,615, Corrected Notice of Allowability mailed on Jan. 29, 2015, 4 pages.
U.S. Appl. No. 12/203,816, Corrected Notice of Allowability mailed on Feb. 10, 2015, 6 pages.
U.S. Appl. No. 12/203,816, Notice of Allowance mailed on Dec. 19, 2014, 8 pages.
Non-Final Office Action for U.S. Appl. No. 14/288,265 mailed on Apr. 11, 2016, all pages.
AJAX & Security: Vulnerability in DWR Security Logic Identified Can Potentially be exploited to launce DoS attacks and break into back-end servers, AjaxWorld™ Magazine, downloaded on Oct. 6, 2008 from http:/lajax.sys-con.com/node/319868, Jan. 8, 2007, 4 pages.
Business Process Language (BPEL) and Oracle BPEL Process Manager, Oracle FAQ,at URL: http://www .oracle.com/tech no logy/prod ucts/ias/bpel/htdocs/orabpel_faq. html? template= . . . , Nov. 11, 2009, 3 pages.
Client-Server Modernization—From Oracle® Forms to Java, VGO Software Products, printed at URL: http://www.vgosoftware.com/products/evo/index.php, Aug. 28, 2009, 2 pages.
Direct Web Remoting, About DWR's Javascript Security, downloaded from http://directwebremoting.org/dwr/security/script-tag-protection, Oct. 6, 2008, 4 pages.
Direct Web Remoting, DWR version 2—New and Noteworthy, downloaded from http://directwebremoting.org/dwr/changelog/dwr20, Dec. 5, 2008, 4 pages.
Direct Web Remoting, DWR: Easy AJAX for JAVA, downloaded from http://directwebremoting.org/dwr/overview/dwr, Oct. 6, 2008, 2 pages.
Direct Web Remoting, Safari, GET and Request Forgery, downloaded from http://directwebremoting.org/dwr/security/allowGetForSafariButMakeForgeryEasier, Oct. 6, 2008, 1 page.
Direct Web Remoting, Security, downloaded from http://directwebremoting.org/dwr/security, Oct. 6, 2008, 4 pages.
Dynamic Structure in ADF UIX Pages, Oracle ADF UIX Developer's Guide, downloaded from http://www.oracle.com/webapps/online-help/jdeveloper/1 0.1.2/state/content/navId.4/navSetId/vtAnchor. Delta Tree!vtTopicFile.uixheip%7Cuixdevguide%7Cdynamic%7Ehtml/, Apr. 21, 2008, pp. 1-11.
Exodus—Main Features Benefits, CipherSoft Inc, Products, at URL: http://www.ciphersoftinc.com/products/expdus-features benefits.html, Aug. 28, 2009, 3 pages.
Exodus® Products, CipherSoft Inc. at URL: http://www.ciphersoftinc.com/products/migration-products-overview.html, Aug. 28, 2009, 3 pages.
File and Registry Virtualization—the good, the bad, and the ugly, Jerry's Incoherent Babbling;Windows Connected Blog; at URL: http://windowsconnected.com/blogs/jerry/archive/2005/12/19/file-and-registry-virtualization-the-Good-the-bad-and-t . . . , Dec. 19, 2005, 6 pages.
Google Web Toolkit, Product Overview, downloaded from http://code.google.com/webtoolkiUoverview. html, Oct. 6, 2008, 3 pages.
Oracle Application Framework, Oracle, Dec. 2006, pp. 1-242.
Oracle Forms to Java Modernization, at URL: http://www.vgosoftware.com/products/evo/walkthrough.php; VGO Software Information, Aug. 28, 2009, 5 pages.
Vgo Software First to Convert Oracle Forms to Oracle ADF V11, VGO News http://www.vgosoftware.com/abouUnews/view article. php?new id=35;, Aug. 28, 2009, 2 pages.
U.S. Appl. No. 12/029,600, Final Office Action mailed on Oct. 19, 2011, 21 pages.
U.S. Appl. No. 12/029,600, Non-Final Office Action mailed on Apr. 27, 2011, 29 pages.
U.S. Appl. No. 12/029,600, Notice of Allowance mailed on Jun. 11, 2013, 6 pages.
U.S. Appl. No. 12/029,600, Notice of Allowance mailed on Nov. 7, 2012, 9 pages.
U.S. Appl. No. 12/029,600, Notice of Allowance mailed on Feb. 5, 2013, 9 pages.
U.S. Appl. No. 12/029,600, Non-Final Office Action mailed on Sep. 17, 2012, 24 pages.
U.S. Appl. No. 12/029,600, Terminal Disclaimer mailed on Oct. 25, 2011, 1 page.
U.S. Appl. No. 12/029,605, Advisory Action mailed on Dec. 18, 2013, 4 pages.
U.S. Appl. No. 12/029,605, Final Office Action mailed on Nov. 2, 2011, 13 pages.
U.S. Appl. No. 12/029,605, Final Office Action mailed on Sep. 28, 2010, 13 pages.
U.S. Appl. No. 12/029,605, Final Office Action mailed on Sep. 6, 2013, 19 pages.
U.S. Appl. No. 12/029,605, Non-Final Office Action mailed on May 12, 2010, 11 pages.
U.S. Appl. No. 12/029,605, Non-Final Office Action mailed on Jul. 20, 2011, 13 pages.
U.S. Appl. No. 12/029,605, Non-Final Office Action mailed on Apr. 10, 2013, 14 pages.
U.S. Appl. No. 12/029,605, Notice of Allowance mailed on Mar. 3, 2014, 9 pages.
U.S. Appl. No. 12/029,605, Notice of Allowance mailed on May 28, 2014, 2 pages.
U.S. Appl. No. 12/029,609, Final Office Action mailed on Nov. 8, 2011, 13 pages.
U.S. Appl. No. 12/029,609, Final Office Action mailed on Oct. 13, 2010, 14 pages.
U.S. Appl. No. 12/029,609, Non-Final Office Action mailed on May 26, 2010, 17 pages.
U.S. Appl. No. 12/029,609, Non-Final Office Action mailed on Jul. 28, 2011, 29 pages.
U.S. Appl. No. 12/029,609, Notice of Allowance mailed on May 29, 2013, 14 pages.
U.S. Appl. No. 12/029,609, Notice of Allowance mailed on Feb. 4, 2013, 24 pages.
U.S. Appl. No. 12/029,615, Advisory Action mailed on Oct. 16, 2012, 5 pages.
U.S. Appl. No. 12/029,615, Non-Final Office Action mailed on Feb. 15, 2012, 28 pages.
U.S. Appl. No. 12/029,615, Non-Final Office Action mailed on Mar. 21, 2014, 29 pages.
U.S. Appl. No. 12/029,615, Final Office Action mailed on Jul. 31, 2012, 33 pages.
U.S. Appl. No. 12/029,724, Final Office Action mailed on Apr. 30, 2013, 22 pages.
U.S. Appl. No. 12/029,724, Final Office Action mailed on May 5, 2011, 21 pages.
U.S. Appl. No. 12/029,724, Non-Final Office Action mailed on Dec. 14, 2010, 22 pages.

(56) References Cited

OTHER PUBLICATIONS

U.S. Appl. No. 12/029,724, Notice of Allowance mailed on Jun. 24, 2014, 13 pages.
U.S. Appl. No. 12/029,724, Non-Final Office Action mailed on Jan. 7, 2013, 31 pages.
U.S. Appl. No. 12/101,420, Final Office Action mailed on Feb. 24, 2012, 20 pages.
U.S. Appl. No. 12/101,420, Non-Final Office Action mailed on Oct. 5, 2011, 18 pages.
U.S. Appl. No. 12/101,420, Notice of Allowance mailed on Mar. 17, 2014, 8 pages.
U.S. Appl. No. 12/101,420, Notice of Allowance mailed on Aug. 28, 2013, 9 pages.
U.S. Appl. No. 12/138,997, Final Office Action mailed on Dec. 5, 2011, 13 pages.
U.S. Appl. No. 12/138,997, Non Final Office Action mailed on Jun. 24, 2011, 15 pages.
U.S. Appl. No. 12/138,997, Notice of Allowance mailed on Nov. 27, 2013, 13 pages.
U.S. Appl. No. 12/203,816, Advisory Action mailed on Aug. 15, 2013, 3 pages.
U.S. Appl. No. 12/203,816, Final Office Action mailed on Jan. 20, 2011, 23 pages.
U.S. Appl. No. 12/203,816, Final Office Action mailed on Jul. 5, 2013, 25 pages.
U.S. Appl. No. 12/203,816, Non-Final Office Action mailed on Sep. 2, 2010, 17 pages.
U.S. Appl. No. 12/203,816, Non-Final Office Action mailed on Oct. 26, 2012, 30 pages.
U.S. Appl. No. 12/210,657, Final Office Action mailed on Apr. 3, 2012, 24 pages.
U.S. Appl. No. 12/210,657, Non-Final Office Action mailed on Sep. 30, 2011, 22 pages.
U.S. Appl. No. 12/210,657, Non-Final Office Action mailed on Apr. 25, 2011, 23 pages.
U.S. Appl. No. 12/210,657, Notice of Allowance mailed on Jun. 26, 2012, 7 pages.
U.S. Appl. No. 12/212,599, Corrected Notice of Allowance mailed on Oct. 2, 2013, 4 pages.
U.S. Appl. No. 12/212,599, Non-Final Office Action mailed on Dec. 22, 2011, 11 pages.
U.S. Appl. No. 12/212,599, Notice of Allowance mailed on Feb. 7, 2014, 5 pages.
U.S. Appl. No. 12/212,599, Notice of Allowance mailed on Jul. 15, 2014, 5 pages.
U.S. Appl. No. 12/212,599, Notice of Allowance mailed on Sep. 25, 2014, 3 pages.
U.S. Appl. No. 12/212,599, Notice of Allowance mailed on Jun. 19, 2013, 6 pages.
U.S. Appl. No. 12/212,599, Non-Final Office Action mailed on Aug. 2, 2012, 14 pages.
U.S. Appl. No. 12/330,008, Final Office Action mailed on Apr. 10, 2012, 14 pages.
U.S. Appl. No. 12/330,008, Non-Final Office Action mailed on Dec. 21, 2011, 15 pages.
U.S. Appl. No. 12/330,008, Notice of Allowance mailed on Aug. 7, 2012, 17 pages.
U.S. Appl. No. 12/330,008, Notice of Allowance mailed on Jun. 11, 2012, 8 pages.
U.S. Appl. No. 12/487,004, Advisory Action mailed on May 24, 2012, 3 pages.
U.S. Appl. No. 12/487,004, Final Office Action mailed on Dec. 27, 2013, 18 pages.
U.S. Appl. No. 12/487,004, Final Office Action mailed on Mar. 19, 2012, 31 pages.
U.S. Appl. No. 12/487,004, Non Final Office Action mailed on Sep. 24, 2013, 22 pages.
U.S. Appl. No. 12/487,004, Non-Final Office Action mailed on Sep. 28, 2011, 30 pages.
U.S. Appl. No. 12/487,004, Notice of Allowance mailed on Jun. 16, 2014, 2 pages.
U.S. Appl. No. 12/487,004, Notice of Allowance mailed on Mar. 6, 2014, 5 pages.
U.S. Appl. No. 12/790,437, Final Office Action mailed on Jul. 12, 2013, 12 pages.
U.S. Appl. No. 12/790,437, Non-Final Office Action mailed on Dec. 30, 2013, 15 pages.
U.S. Appl. No. 12/790,437, Notice of Allowance mailed on Jun. 12, 2014, 5 pages.
U.S. Appl. No. 12/790,437, Final Office Action mailed on Jan. 30, 2013, 26 pages.
U.S. Appl. No. 12/790,437, Supplemental Notice of Allowability mailed on Aug. 13, 2014, 2 pages.
U.S. Appl. No. 12/790,445, Final Office Action mailed on Jul. 5, 2013, 10 pages.
U.S. Appl. No. 12/790,445, Non Final Office Action mailed on Dec. 31, 2013, 13 pages.
U.S. Appl. No. 12/790,445, Non-Final Office Action mailed on Dec. 19, 2012, 23 pages.
U.S. Appl. No. 12/790,445, Notice of Allowance mailed on Jun. 4, 2014, 5 pages.
U.S. Appl. No. 13/360,127, Non-Final Office Action mailed on Apr. 22, 2014, 16 pages.
U.S. Appl. No. 12/029,615, Notice of Allowance mailed on Oct. 2, 2014, 15 pages.
Altenhofen et al., ASMs in Service Oriented Architectures, Journal of Universal Computer Science, vol. 14, No. 12, 2008, 25 pages.
Belsiegel et al., SCA Service Component Architecture—Assembly Model Specification, SCA version 1.00 BEA Systems, Inc., Mar. 15, 2007, 91 pages.
Box et al., Web Services Addressing (WS-Addressing), http://www.w3.org/Submission/ws-addressing/#Toc77464317, Aug. 18, 2009, 23 pages.
Carey et al., Making BPEL Processes Dynamic, Oracle Technology Network, Aug. 18, 2009, 8 pages.
Cetin et al., A mashup-based strategy for migration to service-oriented computing, IEEE International Conference on Pervasive Services, IEEE, Jul. 20, 2007.
Chapman et al., SCA Service Component Architecture—Client and Implementation Model Specification for WS-BPEL, SCA version 1.00, BEA Systems, Inc., Mar. 21, 2007, 15 pages.
Chappell et al., Introducing SCA, David Chappell & Associates, Jul. 2007, pp. 1-22.
Chappell et al., Ready for Primetime: The Next-Generation, Grid-Enabled Service-Oriented Architecture, SOA—The SOA Magazine, Sep. 3, 2007, pp. 1-10.
Chen et al., Feature Analysis for Service-Oriented Reengineering, IEEE 12th Asia-Pacific Software Engineering Conference (APSEC 2005), Taipei, Taiwan, Dec. 2005, 8 pages.
Claessens et al., A Tangled World Wide Web of Security Issues, First Monday, vol. 7 No. 3-4, Mar. 2002.
Claypool et al., Optimizing Performance of Schema Evolution Sequences, Objects and Databases, Lecture Notes in Computer Science vol. 1944, Mar. 1999, pp. 114-127.
Curphey et al., Web Application Security Assessment Tools, IEEE, 2006, pp. 32-41.
Dipaola et al., Subverting Ajax, 23rd CCC Conference, Dec. 2006, pp. 1-8.
Hildebrandt, Web-based Document Management, BTU 2001, 2001, pp. 1-21.
Hohpe et al., Messaging Systems, Enterprise Integration Patterns Chapter 3, Pearson Education, Inc., Boston, Massachusetts, 2004, 45 pages.
Li et al., Leveraging legacy codes to distributed problem-solving environments: a Web services approach, Software: Practice and experience, vol. 34, No. 13, 2004, pp. 1297-1309.
Li et al., SGrid: a service-oriented model for the Semantic Grid, Future Generation Computer Systems, vol. 20, No. 1, 2004, pp. 7-18.
Ma, Discovery-Based Service Composition, National Central University, Doctoral Dissertation, Jan. 2007, 109 pages.

(56) References Cited

OTHER PUBLICATIONS

Mietzner et al., Defining Composite Configurable SaaS Application Packages Using SCA Variability Descriptors and Multi-Tenancy Patters, Third International Conference on Internet and Web Applications and Services, 2008. ICIW '08, Jun. 2008, pp. 156-161.

Nagappan et al., XML Processing and Data Binding with Java APIs, Developing Java Web Services: Architecting and Developing Secure Web Services Using Java [online] Retrieved from Internet :<http://java.sun.com/developer/Books/j2ee/devjws/>, 2003, pp. 313-399.

Phanouriou, UIML: A Device-Independent User Interface Markup Language, Virginia Polytechnic Institute and State University, Sep. 26, 2000, 172 pages.

Phillips, File and Registry Virtualization—the good, the bad and the ugly, Window's Connected UserID: Jerry. Jerry's Incoherent Babbling:<http://windowsconnected.com/blogsfjerry/archive/2005/12/19/file-and-registry-virtualization-the-good-the thebad-and-the-ugly.aspx>, Dec. 19, 2005, 6 pages.

Shepherd et al., Oracle SCA-The Power of the Composite, An Oracle White Paper, Aug. 2009, pp. 1-19.

Smith, Toward an Application Framework for Interoperability, Communications of the ACM, Oct. 2004, vol. 47, No. 10, pp. 93-97.

Sneed et al., Integrating legacy software into a service oriented architecture, Software Maintenance and Reengineering, CSMR, IEEE, 2006.

Steinberg, Data Binding with JAXB, <https://www6.software.ibm.com/developerworks/education/x-jaxb/x-jaxb-a4.pdf>, 2003, pp. 1-34.

Vesperman, Essential CVS, O'Reilly Media Inc., Jun. 9, 2003.

Yang et al., Web Component: A Substrate for Web Service Reuse and Composition, Proceedings of the 14th International Conference on Advanced Information Systems Engineering, 2002, pp. 21-36.

Zhang et al., Schema Based XML Security: RBAC Approach, IFIP International Federation for Information Processing vol. 142, 2004, pp. 330-343.

U.S. Appl. No. 14/288,265, Final Office Action mailed on Oct. 6, 2016, 19 pages.

* cited by examiner

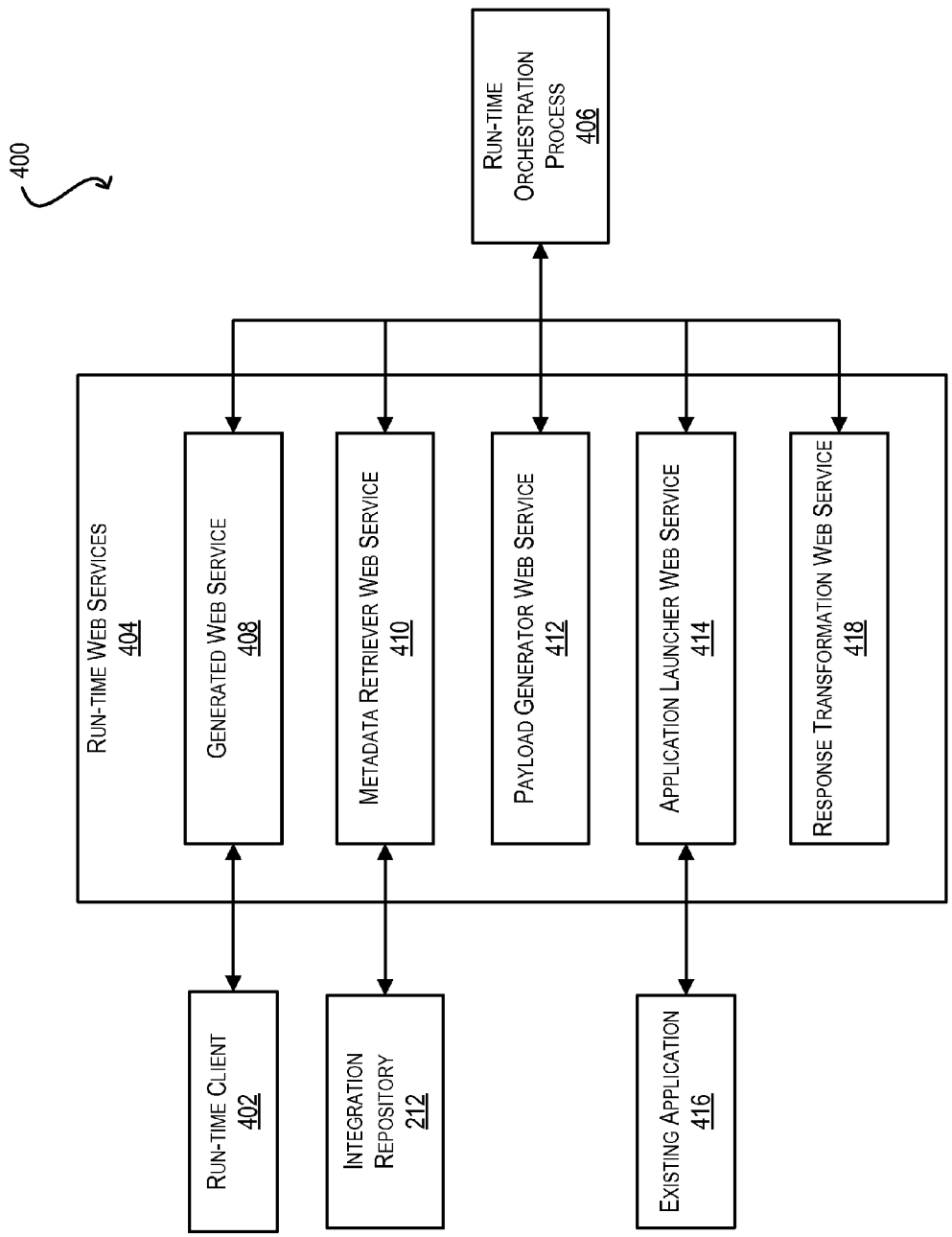

SYSTEM AND METHOD FOR META-DATA DRIVEN, SEMI-AUTOMATED GENERATION OF WEB SERVICES BASED ON EXISTING APPLICATIONS

CROSS-REFERENCES TO RELATED APPLICATIONS

The present application is a continuation of U.S. patent application Ser. No. 12/487,004 filed Jun. 18, 2009, entitled "SYSTEM AND METHOD FOR META-DATA DRIVEN, SEMI-AUTOMATED GENERATION OF WEB SERVICES BASED ON EXISTING APPLICATIONS," which claims the benefit and priority under 35 U.S.C. 119(e) of U.S. Provisional Application No. 61/098,571, filed Sep. 19, 2008, entitled "SYSTEM AND METHOD FOR META-DATA DRIVEN, SEMI-AUTOMATED GENERATION OF WEB SERVICES BASED ON EXISTING APPLICATIONS," the entire contents of which are incorporated herein by reference for all purposes.

Further, the present application is related to commonly-owned U.S. patent application Ser. No. 12/203,816, filed Sep. 3, 2008 and entitled "SYSTEM AND METHOD FOR INTEGRATION OF BROWSER-BASED THIN CLIENT APPLICATIONS WITHIN DESKTOP RICH CLIENT ARCHITECTURE," the entire contents of which are incorporated herein by reference for all purposes.

BACKGROUND OF THE INVENTION

Embodiments of the present invention relate to software reuse, and more particularly relate to techniques for reusing logic implemented in an existing software application in the context of a Web service.

Over the years, many enterprises have invested significant resources in developing and/or deploying business applications that rely on specific application technologies. Examples of such application technologies include Oracle Forms and Oracle Applications Framework (both developed by Oracle Corporation), Java Server Pages (JSP), and the like. Now, there is a growing trend in the IT industry towards integrating the functionalities of these business applications via a loosely-coupled, service-oriented architecture (SOA). To realize this goal, there is a need to expose the business logic implemented in these existing business applications as new Web services.

Unfortunately, the nature of many application technologies makes it difficult to reuse program code written via these technologies in a Web service context. For example, applications built using Oracle Forms (hereinafter "Forms") or Oracle Applications Framework (hereinafter "OAF") are typically self-contained entities with limited capability for exposing the business logic implemented therein to external consumers. In addition, the business logic in Forms or OAF-based applications is often tied to user interface components specific to those technologies, thus making it difficult to reuse this logic in a generic manner.

One method for addressing the difficulties above is to re-factor a portion of the program code for an existing application into an alternative format that can be more easily exposed as a Web service. For example, in the case of a Forms-based application, business logic implemented within the form can be re-written as one or more PL/SQL APIs, which can then be directly invoked by a Web service. However, this approach involves the creation and maintenance of two parallel code lines (e.g., the Forms-based application and the PL/SQL APIs), thus requiring significant development time and effort. If a large number of existing applications need to re-factored in this manner, this approach may not be practical or feasible.

Another method for addressing the difficulties above is to completely convert/migrate the existing application to an alternative application technology that is more amenable to the generation of component Web services. Using this method, a Forms-based application may, for example, be converted into a Java/J2EE-based implementation. However, this approach also requires a significant amount of development resources. In addition, the complete, componentized conversion of all business logic within the existing application would not be guaranteed because the aim of this approach is the conversion of existing application code, rather than the reuse of that code.

Accordingly, it would be desirable to have techniques that allow existing application logic to be reused for new Web services without any need for modifying or re-factoring existing code.

BRIEF SUMMARY OF THE INVENTION

Embodiments of the present invention provide techniques for reusing logic implemented in an existing software application such that the logic can be exposed as a Web service or in any other service-oriented context. In one set of embodiments, a design-time technique is provided that comprises, inter alia, receiving program code for an existing software application, generating metadata based on the program code, and customizing the metadata to align with an intended Web service. Artifacts for the Web service are then generated based on the customized metadata. In another set of embodiments, a run-time technique is provided that comprises, inter alia, receiving a payload representing an invocation of a Web service operation of the generated Web service, processing the payload, and, based on the processing, causing the existing software application to execute an operation in response to the invocation of the Web service operation.

According to one embodiment of the present invention, a method for facilitating the reuse of logic implemented in an existing software application comprises receiving, at a computer system, a selection of an existing software application, and generating, by the computer system, metadata based on program code for the existing software application. The method further comprises receiving, at the computer system, one or more customizations to be applied to the metadata, and modifying, by the computer system, the metadata based on the one or more customizations. Artifacts for a Web service are then generated by the computer system based on the modified metadata, where the Web service is configured to expose a Web service operation that, when executed, causes an existing operation implemented in the existing software application to be executed.

In one set of embodiments, the metadata comprises a first metadata file defining the existing operation implemented in the existing software application, a second metadata file defining one or more data objects associated with the existing operation, and a third metadata file defining names for the existing operation and its associated data objects.

In one set of embodiments, the one or more customizations include an alternative operation name for the existing operation and alternative data object names for the one or more data objects associated with the existing operation.

In one set of embodiments, modifying the metadata based on the one or more customizations comprises modifying the metadata to include the alternative operation name and/or the alternative data object names.

In one set of embodiments, generating artifacts for the Web service based on the modified metadata comprises generating an operation definition file defining the Web service operation, the Web service operation being identified in the operation definition file by the alternative operation name; and generating an object definition file defining Web service data objects corresponding to the one or more data objects associated with the existing operation.

In one set of embodiments, generating artifacts for the Web service based on the modified metadata further comprises generating a mapping file identifying the existing operation, its associated data objects, and a mapping between the existing operation and the alternative operation name; and generating a template payload file defining a template payload to be transmitted to the existing software application at a time of invocation of the Web service operation. In various embodiments, the template payload includes an invocation of the existing operation and a sequence of zero or more sub-operations to be executed by the existing software application in order to carry out the existing operation.

In one set of embodiments, generating artifacts for the Web service based on the modified metadata further comprises generating program code and related metadata for the Web service, where the program code and related metadata includes one or more Java classes and one or more Web Service Description Language (WSDL) files, and where the one or more WSDL files are generated based on the operation definition file.

In one set of embodiments, the method above further comprises executing a script for packaging the program code and related metadata for the Web service into an archive, deploying the archive to an application server in a run-time environment, and storing the mapping file and the template payload file in a repository accessible to the application server.

In one set of embodiments, the method above further comprises receiving, at another computer system configured to run the Web service, a payload file representing an invocation of the Web service operation and including one or more input parameter values for the Web service operation, and invoking, at the another computer system, an orchestration process for processing the payload file. In one set of embodiments, the orchestration process is a Business Process Execution Language (BPEL) process.

In one set of embodiments, the orchestration process is configured to invoke a first utility Web service by passing the payload file as input, receive from the first utility Web service a name of the existing software application and a name of the existing operation, invoke the first utility Web service by passing the name of the existing software application and the name of the existing operation as input, and receive from the first utility Web service the mapping file and the template payload file. The orchestration process is further configured to invoke a second utility Web service by passing the mapping file, the template payload file, and the payload file as input, and receive from the second utility Web service a final payload file generated based on the mapping file, the template payload file, and the payload file, where the final payload file identifies the existing operation, a sequence of zero or more sub-operations to be performed by the existing software application in order to carry out the existing operation, and the one or more input parameter values included in the payload file. The orchestration process is further configured to invoke a third utility Web service by passing the final payload file as input, where the third utility Web service is configured to communicate with the existing software application and cause the existing software application to execute the existing operation.

In one set of embodiments, the orchestration process is further configured to the orchestration process is further configured to receive from the third utility Web service one or more output parameter values outputted by the existing operation; invoke a fourth utility Web service by passing the one or more output parameter values as input, the fourth utility Web service being configured to transform a format of the one or more output parameter values into a format understood by the Web service; receive the one or more transformed output parameter values; and pass the one or more transformed output parameter values to the Web service.

According to another embodiment of the present invention, a system for facilitating the reuse of logic implemented in an existing software application is provided. The system comprises a first computer system in a design-time environment, where the first computer system is configured to receive a selection of an existing software application and generate metadata based on program code for the existing software application. The first computer system is further configured to receive one or more customizations to be applied to the metadata and modify the metadata based on the one or more customizations. Artifacts for a Web service are then generated based on the modified metadata, where the Web service is configured to expose a Web service operation that, when executed, causes an existing operation implemented in the existing software application to be executed.

In one set of embodiments, the system above further comprises a second computer system in a run-time environment, where the second computer system is configured to receive a payload file representing an invocation of the Web service operation and including one or more input parameter values for the Web service operation, and invoke an orchestration process for processing the payload file.

According to another embodiment of the present invention, a machine-readable medium is provided, the machine-readable having stored thereon program code which, when executed by a processing component of a computer system, facilitates the reuse of logic implemented in an existing software application. In various embodiments, the program code comprises code for receiving a selection of an existing software application, code for generating metadata based on program code for the existing software application, code for receiving one or more customizations to be applied to the metadata, code for modifying the metadata based on the one or more customizations, and code for generating artifacts for a Web service based on the modified metadata, the Web service being configured to expose a Web service operation that, when executed, causes an existing operation implemented in the existing software application to be executed.

In one set of embodiments, the program code further comprises code for receiving a payload file representing an invocation of the Web service operation and including one or more input parameter values for the Web service operation, and code for invoking an orchestration process for processing the payload file.

A further understanding of the nature and advantages of the embodiments disclosed herein may be realized by reference to the remaining portions of the specification and the attached drawings.

BRIEF DESCRIPTION OF THE DRAWINGS

FIG. 4 is a simplified block diagram illustrating a run-time system for executing a Web service generated via the design-time system of FIG. 2 in accordance with an embodiment of the present invention.

DETAILED DESCRIPTION OF THE INVENTION

In the following description, for the purposes of explanation, numerous details are set forth in order to provide an understanding of the present invention. It will be apparent, however, to one skilled in the art that the present invention may be practiced without some of these details.

Embodiments of the present invention provide a framework for generating and running Web services that reuse logic implemented in existing software applications (e.g., Forms-based applications, OAF-based applications, etc.). By reusing existing logic in this manner, enterprises can enhance the value of their investments in their existing applications. For example, Web service-enabled versions of these applications can be incorporated into Business Process Execution Language (BPEL) processes, Web-based applications (such as PHP, ASP, JSP, and the like), and other types of Web services clients. In addition, by making these Web services available to internal and external partners, enterprises can use these Web services as the basis of enterprise "mashups" or composite applications.

Embodiments of the present invention provide several advantages over prior art approaches for creating Web services based on existing applications. First, the techniques described herein allow for the reuse of existing application logic with requiring any modification or re-factoring of the existing application code base. Second, since the Web services generated using embodiments of the present invention rely on the actual logic/code implemented in existing applications, the run-time behavior of these Web services is identical to the run-time behavior of the existing applications. Third, embodiments of the present invention natively provide for the ability to generate web services that are primitive or composite in nature. For example, a BPEL-based composite service can be created that invokes operations performed by multiple, different applications. Fourth, the design-time process of creating a Web service can be either fully or partially automated, thereby reducing development effort and expense. Fifth, embodiments of the present invention can run on J2EE standards compatible middleware environments. Sixth, the Web services generated using embodiments of the present invention have the same performance characteristics as the underlying existing applications. In other words, there is minimal or no performance degradation in invoking logic via the generated Web service versus via the existing application.

In one set of embodiments, the techniques described herein can be implemented as an adapter to the BPEL P2P pack delivered as part of the Oracle AIA and Oracle eBusiness Suite Integration Foundation Pack, developed by Oracle Corporation. This provides customers greater flexibility to integrate the business logic implemented in existing applications into their process-to-process flows.

Figure 1:
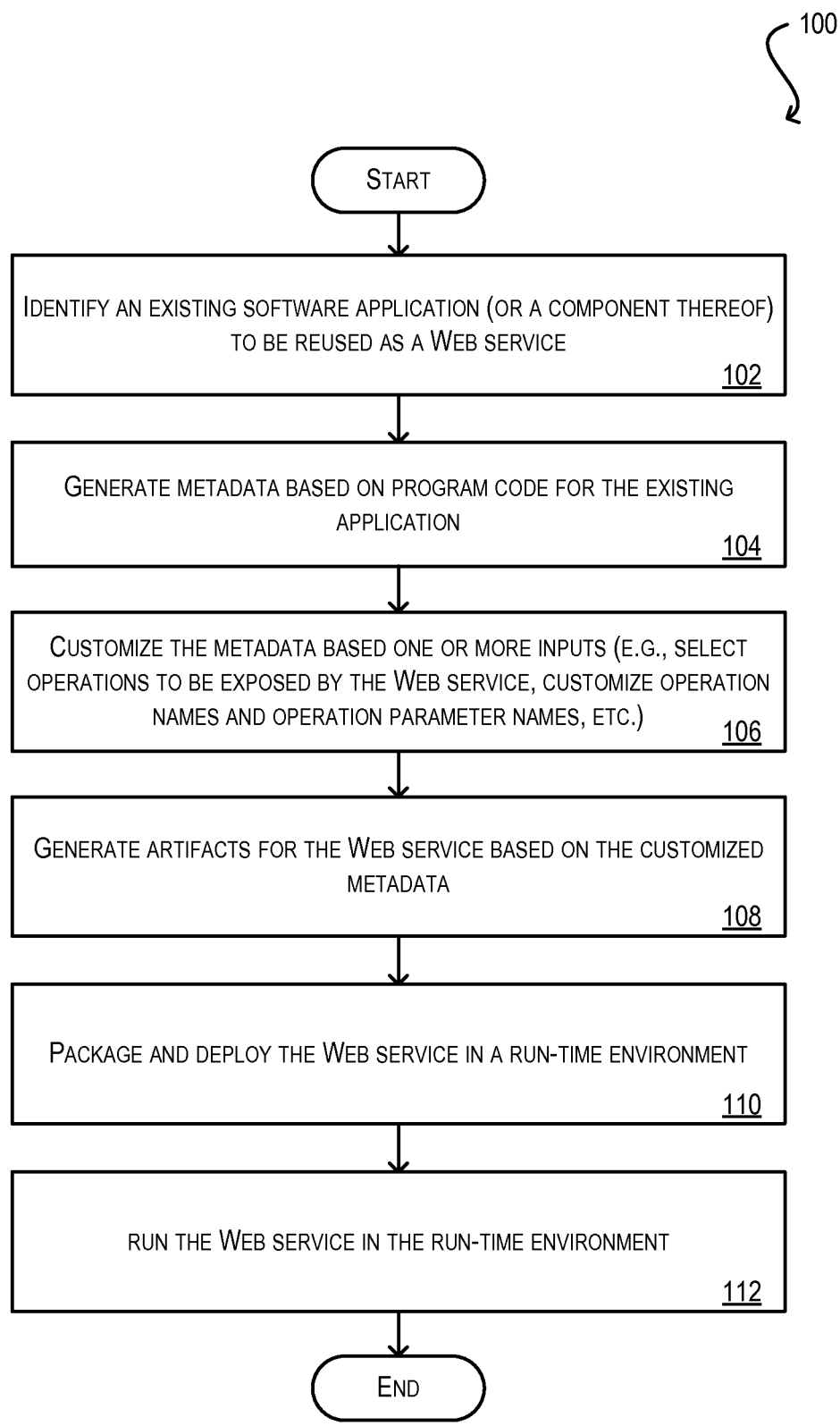
FIG. 1 is a flowchart illustrating a process for reusing existing application logic in the context of a Web service in accordance with an embodiment of the present invention.

FIG. 1 is a flowchart 100 illustrating a high-level process for reusing existing application logic in the context of a Web service according to an embodiment of the present invention. In particular, steps 102 to 110 of flowchart 100 correspond to a design-time flow for generating a new Web service that reuses logic implemented in an existing software application, and step 112 corresponds to a run-time flow for running the newly-generated Web service. In various embodiments, the processing of flowchart 100 may be implemented in software, hardware, or combinations thereof. Further, the processing of flowchart 100 may be encoded as program code stored on a machine-readable medium.

At step 102, an existing software application (or a component thereof) is identified, where the existing application is to be reused in the form of a new Web service. In one set of embodiments, the existing application is a Forms or OAF-based application. Alternatively, the existing application may be an application built using any type of application technology.

At step 104, program code for the existing application is parsed and metadata based on the program code is generated. In various embodiments, the metadata comprises information pertaining to the operations and/or data objects implemented in the existing application.

Once the metadata is generated at step 104, the metadata is customized based on one or more inputs (step 106). Generally speaking, this customization determines how the operations and data objects included in the generated metadata will map to operations and/or data objects to be exposed/used by the new Web service. For example, the customization process may include selecting one or more operations included in the metadata to be exposed as a Web service operation by the new Web service. The customization process may also include specifying alternative names for operations and/or data objects included in the metadata, where the alternative names will be used to refer to corresponding operations and/or data objects in the program code for the new Web service.

At step 108, artifacts for the new Web service are generated based on the customized metadata. The artifacts may include, for example, program code and related metadata for running the Web service, such as Java classes, Web Service Description Language (WSDL) files, and the like. In a particular set of embodiments, the artifacts may also include one or more files that are used at Web service run-time to invoke an operation implemented in the existing application when a corresponding Web service operation of the Web service is invoked. The process of generating these artifacts, as well as the content of the artifact files, is discussed in greater detail with respect to FIGS. 3A and 3B below.

Once the artifacts for the Web service are generated, a subset of these artifacts is packaged into an archive and deployed on one or more systems in a run-time environment (step 110). In addition, a service specification for the newly-generated Web service may be registered in a service directory/repository. The Web service can then be started in the run-time environment to provide services to one or more service consumers. As indicated above, when a Web service operation exposed by the Web service is invoked, a corresponding operation in the existing application is executed. In this manner, logic implemented in the existing application can be reused through the Web service. The run-time flow for running the generated Web service is discussed in greater detail with respect to FIGS. 5A and 5B below.

It should be appreciated that the specific steps illustrated in FIG. 1 provide a particular method for facilitating the reuse of existing application logic in the context of a Web service according to embodiments of the present invention. Other sequences of steps may also be performed according to alternative embodiments. For example, individual steps illustrated in FIG. 1 may include multiple sub-steps that may be performed in various sequences as appropriate to the individual step. Further, additional steps may be added, or existing steps may be removed, depending on the particular application. One of ordinary skill in the art would recognize many variations, modifications, and alternatives.

Figure 2:
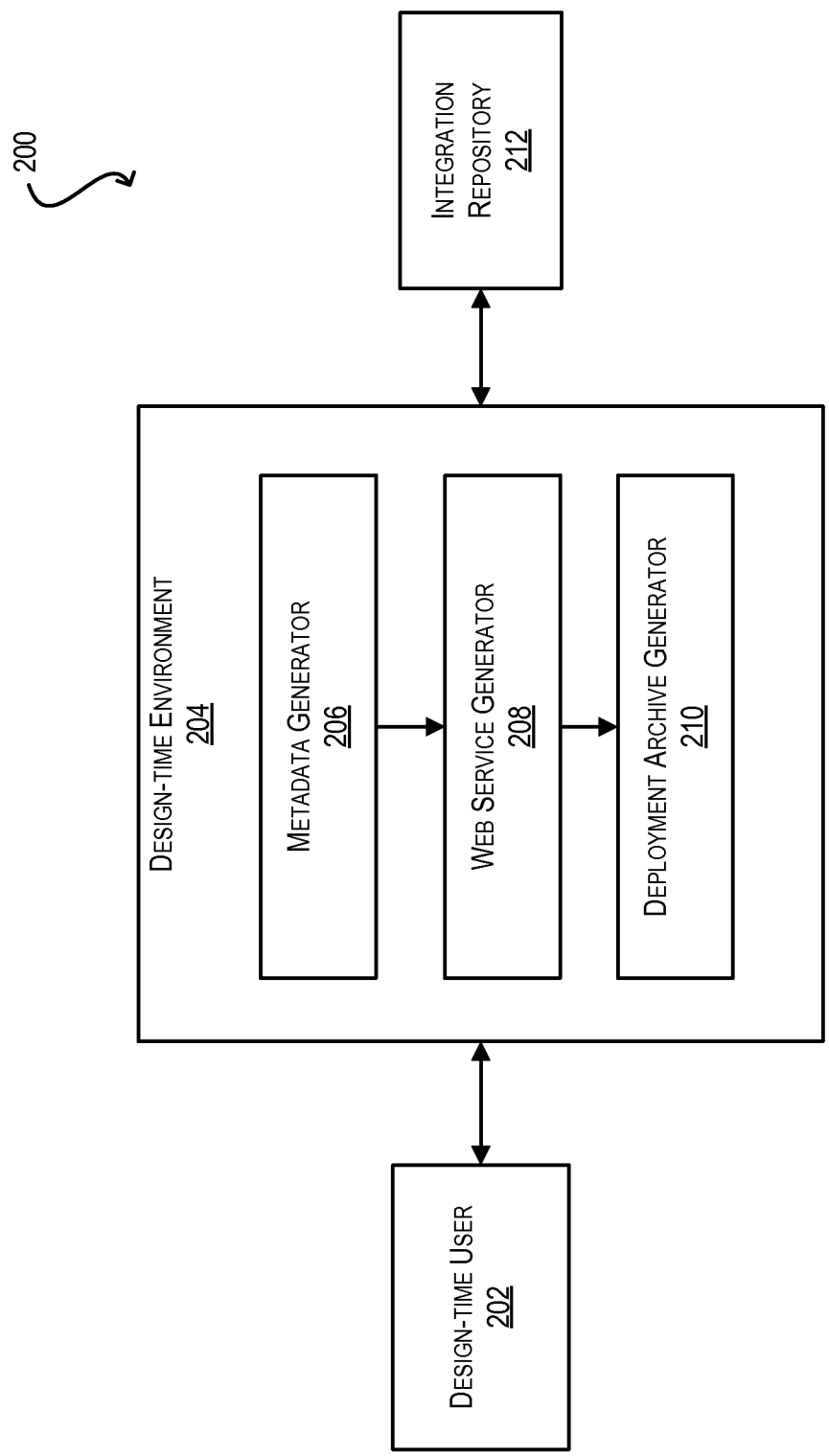
FIG. 2 is a simplified block diagram illustrating a design-time system for generating a Web service in accordance with an embodiment of the present invention.

FIG. 2 is a simplified block diagram illustrating a design-time system 200 for generating a Web service in accordance with an embodiment of the present invention. In various embodiments, the functional components of design-time-system 200 may be used to carry out steps 102 to 110 of flowchart 100. As shown, design-time system 200 includes a design-time user 202 configured to interact with a design-time environment 204. Typically, design-time user 202 will be an individual, such as a Web service developer, that is responsible for guiding the Web service generation process. Alternatively, design-time user 202 may be an automated entity, such as a computer system or process. Design-time environment 204 is a development tool that is used by design-time user 202 to create a Web service. In a particular embodiment, design-time environment 204 is a client-side application development environment, such as JDeveloper, Visual Studio, or the like.

In one set of embodiments, design-time user 202 is configured to select an existing software application (or a component of an existing application) and provide that selection to design-time-environment 204 (per step 102 of FIG. 1). In response, design-time environment 204 is configured to invoke one or more sub-components to generate a Web service based on the existing application. As shown in FIG. 2, these sub-components include a metadata generator 206, a Web service generator 208, and a deployment archive generator 210. Although sub-components 206, 208, 210 are shown as being contained within design-time environment 204, one or more of these sub-components may be external to environment 204. For example, in one embodiment, sub-components 206, 208, 210 may be design-time Web services that are hosted on a machine separate from design-time environment 204.

Metadata generator 206 is configured to receive program code for the existing application and generate metadata based on the program code (per step 104 of FIG. 1). For example, if the existing application is a Forms-based application, metadata generator 206 may receive a form (e.g., an fmb file) and generate metadata based on that form. If the existing application is an OAF-based application, metadata generator 206 may receive one or more Java files (e.g., a Java-based Application Module or Controller Object) and generate metadata based on those Java files.

Web service generator 208 is configured to receive one or more customizations to the metadata generated by metadata generator 206, apply the customizations to the metadata, and generate artifacts for a new Web service based on the customized metadata (per steps 106, 108 of FIG. 1). In one set of embodiments, the one or more customizations may be received from design-time user 202. In another set of embodiments, the one or more customizations may be retrieved from a file or repository comprising predefined customization information. The artifacts generated by Web service generator 208 are files that are required to run the Web service. As discussed previously, these artifacts may include program code and related metadata for the Web service, such as Java classes, WSDL files, and the like. These artifacts may also include specific files, such as a mapping file and a template payload file, that enable the Web service to invoke an operation of the existing application when a corresponding operation of the Web service is invoked.

Once artifacts for the Web service are generated by Web service generator 208, one or more of these artifacts are packaged by deployment archive generator 210. This packaging process may include compiling program code for the Web service, copying required libraries, and generating an archive file (e.g., a WAR/EAR archive). In one set of embodiments, this packaging process is facilitated by a utility such as the Oracle Web Services Assembler (OWSA). The generated archive is then deployed to a run-time environment (per step 110 of FIG. 1). In a particular set of embodiments, the archive (and/or other artifacts generated by Web service generator 208) are stored in an integration repository 212 for later retrieval at service run-time.

Figure 3A:
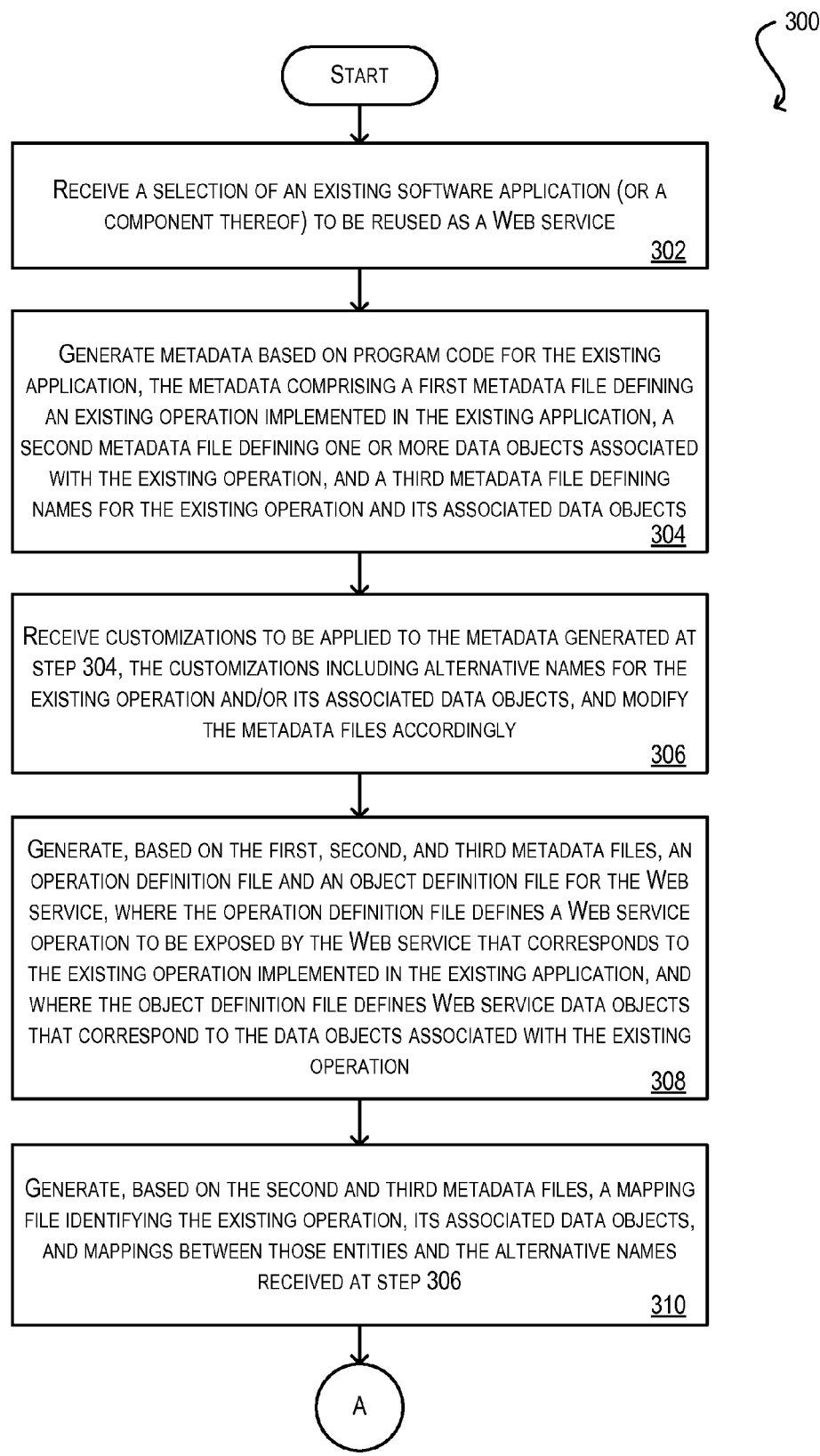
FIGS. 3A and 3B are flowcharts illustrating steps carried out by one or more components of the design-time system of FIG. 2 in accordance with an embodiment of the present invention.
Figure 3B:
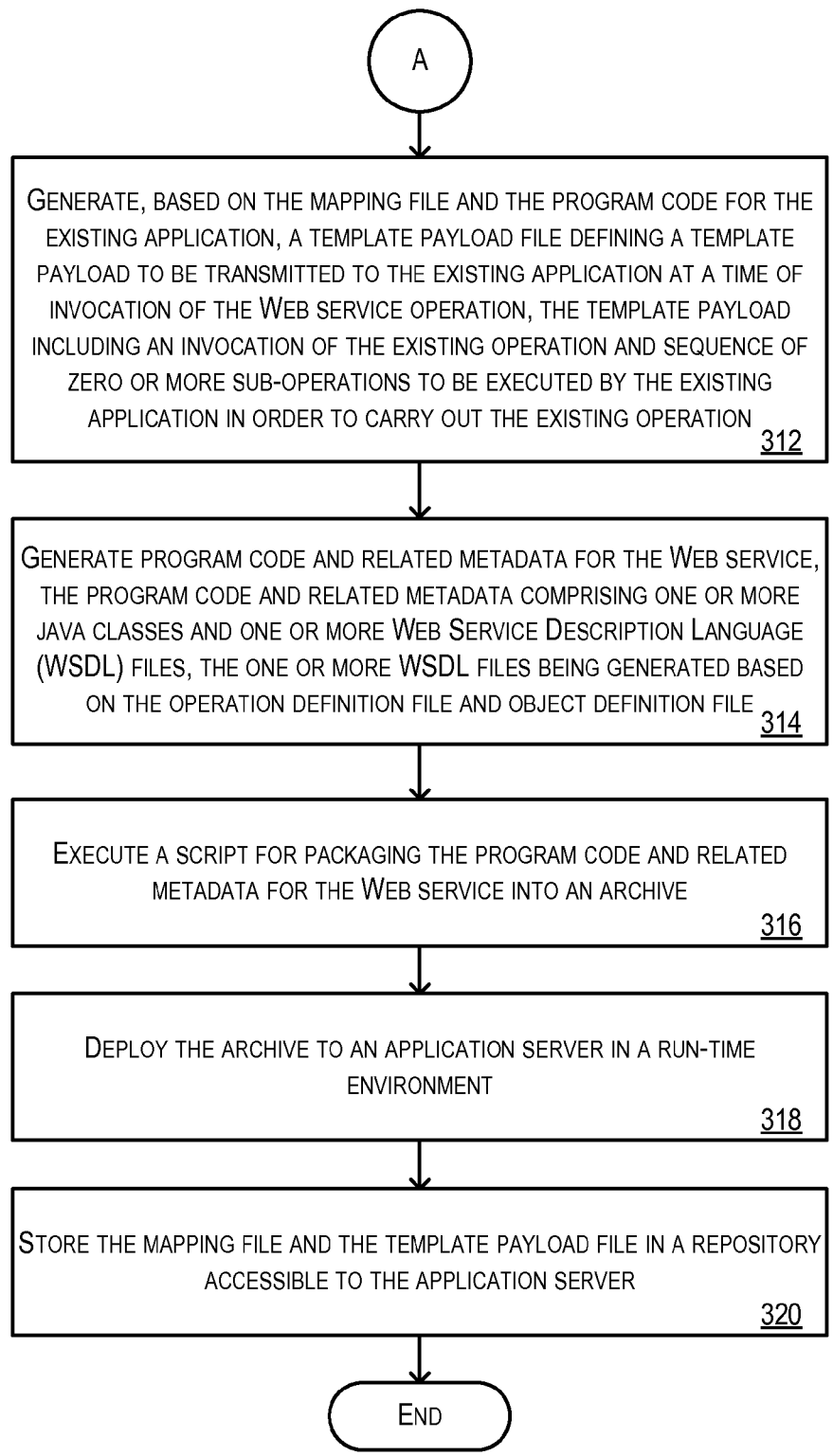

FIGS. 3A and 3B illustrate a flowchart 300 that provides a more detailed description of the design-time flow for generating a Web service discussed with respect to steps 102 to 110 of FIG. 1. In various embodiments, the processing of flowchart 100 may be implemented in software, hardware, or combinations thereof. Further, the processing of flowchart 100 may be encoded as program code stored on a machine-readable medium. In a particular embodiment, the processing of flowchart 300 may be carried out by one or more components of design-time system 200 of FIG. 2.

At step 302, a selection of a existing software application (or a component thereof) to be reused as a Web service is received. As discussed previously, the existing application may be a Forms-based application, an OAF-based application, or an application built using any other type of application technology.

At step 304, metadata is generated based on the program code for the existing application. In one set of embodiments, the metadata generated at step 304 comprises at least three metadata files. The first metadata file defines one or more existing operations implemented in the existing application. For example, if the existing application is a Forms-based application, the operations defined in the first metadata file may include button-based or menu-based operations implemented in a particular form. Alternatively, if the existing application is an OAF-based application, the operations defined in the first metadata file may include button-based operations implemented in a particular OA page. In a specific embodiment, the first metadata file is generated as a Microsoft Excel workbook, and each sheet in the workbook corresponds to an operation in the existing application.

The second metadata file defines one or more data objects associated with the one or more existing operations. For example, if the existing application is a Forms-based application, the data objects defined in the second metadata file may include form blocks and form items. Alternatively, if the existing application is an OAF-based application, the data objects defined in the second metadata file may include one or more class definitions. In a specific embodiment, the second metadata file is also generated as a Microsoft Excel workbook, and each sheet in the workbook corresponds to a form block or a Java class. The workbook may also include a "Relationship" sheet that defines parent/child relationships between the blocks or classes.

The third metadata file defines one or more names associated with the existing operations and data objects defined in the first and second metadata files. As discussed in detail below, the names in the third metadata file represent names for corresponding Web service operations and data objects to be exposed/used by the new Web service. In a specific embodiment, the third metadata file is also generated as a Microsoft Excel workbook, and each sheet in the workbook includes names for a single operation and its associated data objects.

Once the first, second, and third metadata files are generated, customizations to be applied to these files are received (step 306). In an embodiment, this step comprises presenting the generated metadata files to a design-time user (such as design-time user 202 of FIG. 2) and receiving one or more customizations from the user. Generally speaking, these customizations represent modifications that define how the existing operations and data objects included in the metadata files will map to operations and/or data objects to be exposed/used by the new Web service. The one or more customizations may include, for example, a selection of an existing operation defined in the first metadata file to be exposed as a Web service operation by the new Web service. In this case, the first and/or second metadata files may be modified to include only the selected operation(s). The one or more customizations may also include alternative names for an existing operation and/or its associated data objects. For example, assume the first metadata file defines an existing operation "Operation1" that uses data objects "DataObject1" and "DataObject2." The customizations received at step 306 may include an alternative operation name "WSOperation1" for "Operation1" and alternative data object names "WSDataObject1" and "WSDataObject2" for "DataObject1" and "DataObject2" respectively. In this case, the alternative names may be stored in the third metadata file.

At steps 308, 310, 312, 314, various artifacts are created for the new Web service based on the customized metadata of step 306. For example, at step 308, an operation definition file and an object definition file are created for the Web service. The operation definition file defines one or more Web service operations to be exposed by the Web service, and is based on the existing operations defined in the first metadata file and the alternative names defined in the third metadata file. Returning to the example above, if the first metadata file defines an existing operation "Operation1" and if the third metadata file defines an alternative name "WSOperation1" for "Operation1," the operation definition file would define a Web service operation named "WSOperation1" that corresponds to the existing operation "Operation1" implemented in the existing application.

Similarly, the object definition file defines one or more Web service data objects to be used by the Web service, and is based on the existing data objects defined in the second metadata file and the alternative names defined in the third metadata file. For example, if the second metadata file defines existing data objects "DataObject1" and "DataObject2" and if the third metadata file defines alternative names "WSDataObject1" and "WSDataObject2"for "DataObject1" and "DataObject2," the object definition file would define data objects for the Web service named "WSDataObject1" and "WSDataObject2" corresponding to the existing data objects "DataObject1" and "DataObject2" respectively.

At step 310, one or more mapping files are generated based on the second and third metadata files. In various embodiments, one mapping file is created for each existing operation defined in the second metadata file. Each mapping file identifies the existing operation, its associated data objects, and mappings between those entities and the alternative names defined in the third metadata file. As discussed in further detail below, these mapping files are used to determine how to map an invocation of an operation of the new Web service to an existing operation implemented in the existing application at run-time.

At step 312, one or more template payload files are generated based on the mapping files of step 310 and the program code for the existing application. In various embodiments, one template payload file is created for each existing operation defined in the second metadata file. Each template payload file defines a template payload to be delivered to the existing application when a Web service operation corresponding to that existing operation is invoked. In one set of embodiments, the template payload includes an invocation of the existing operation and placeholder (or null) values for the input parameters of the operation. These placeholder values are populated with actual input parameter values at service run-time, and the populated template payload is then transmitted to the existing application for execution. The template payload may also include a sequence of zero or more sub-operations to be executed by the existing application in order to fully carry out the existing operation. For example, if the existing application is a Forms-based application, these sub-operations may include a sequence of one or more form triggers that should be processed upon execution of the existing operation. If the existing application is an OAF-based application, these sub-operations may include a sequence of one or more methods that should be processed upon execution of the existing operation.

At step 314, program code and related metadata for the Web service is generated, where the program code and related metadata comprise one or more Java classes and one or more service definitions (e.g., WSDL files). In one set of embodiments, the Java classes generated at this step include a method that takes a payload file (representing an invocation of an operation of the Web service) as input and calls an orchestration process for processing the payload file and causing a corresponding operation implemented the existing application to be executed. This run-time processing is discussed in greater detail with respect to FIGS. 4, 5A, and 5B below. In a particular embodiment, the WSDL files created at step 314 are based on the operation definition file and/or object definition file generated at step 308.

Once all of the artifacts for the Web service are generated, a script is executed for packaging the program code and related data into an archive. In one set of embodiments, the script is an ANT script configured to copy required libraries for the Java classes, compile the Java code, and invoke an assembler tool such as OWSA to generate a WAR/EAR archive.

The archive is then deployed to an application server in a run-time environment (step 318). In this manner, the generated Web service is made available for consumption by various service clients. In some embodiments, the mapping and template payload files generated at steps 310, 312 may be included in the archive generated at step 316. In other embodiments, the mapping and template payload files may be stored separately in an integration repository (e.g., integration repository 212 of FIG. 2) that is accessible to the application server (step 320).

It should be appreciated that the specific steps illustrated in FIGS. 3A and 3B provide a particular method for generating a Web service according to embodiments of the present invention. Other sequences of steps may also be performed according to alternative embodiments. For example, individual steps illustrated in FIGS. 3A and 3B may include multiple sub-steps that may be performed in various sequences as appropriate to the individual step. Further, additional steps may be added, or existing steps may be removed, depending on the particular application. One of ordinary skill in the art would recognize many variations, modifications, and alternatives.

FIG. 4 is a simplified block diagram of a run-time system 400 for running a Web service generated per FIGS. 3A and 3B in accordance with an embodiment of the present invention. As shown, run-time system includes a run-time client 402 configured to interact with the generated Web service (408). Run-time client 402 may be any type of service consumer, such as a Web-based application, Web portal, an API client, a command line client, or the like. Although only a single run-time client is depicted, it should be appreciated that run-time system 400 may support any number of run-time clients in communication with generated Web service 408 at a time.

Run-time client 402 is configured to send to generated Web service 408 a payload file representing an invocation of an operation exposed by the service. In response, generated Web service 408 is configured to invoke a run-time orchestration process 406 for processing the payload file and causing a corresponding operation implemented in existing application 416 to be executed.

In various embodiments, run-time orchestration process is adapted to call one or more run-time Web services 404 to facilitate this processing. The run-time Web services include a metadata retriever Web service 410 configured to retrieve artifacts for generated Web service 408 from integration repository 212, a payload generator Web service 412 configured to generate a final payload for existing application 416 based on the payload received from run-time client 402, an application launcher Web service 414 configured to communicate the final payload to existing application 416 and receive any output values, and an\ response transformation Web service 418 configured to convert those output values into a format appropriate for generated Web service 408. The processing performed by run-time orchestration process 406 is discussed in greater detail with respect to FIGS. 5A and 5B below.

Figure 5A:
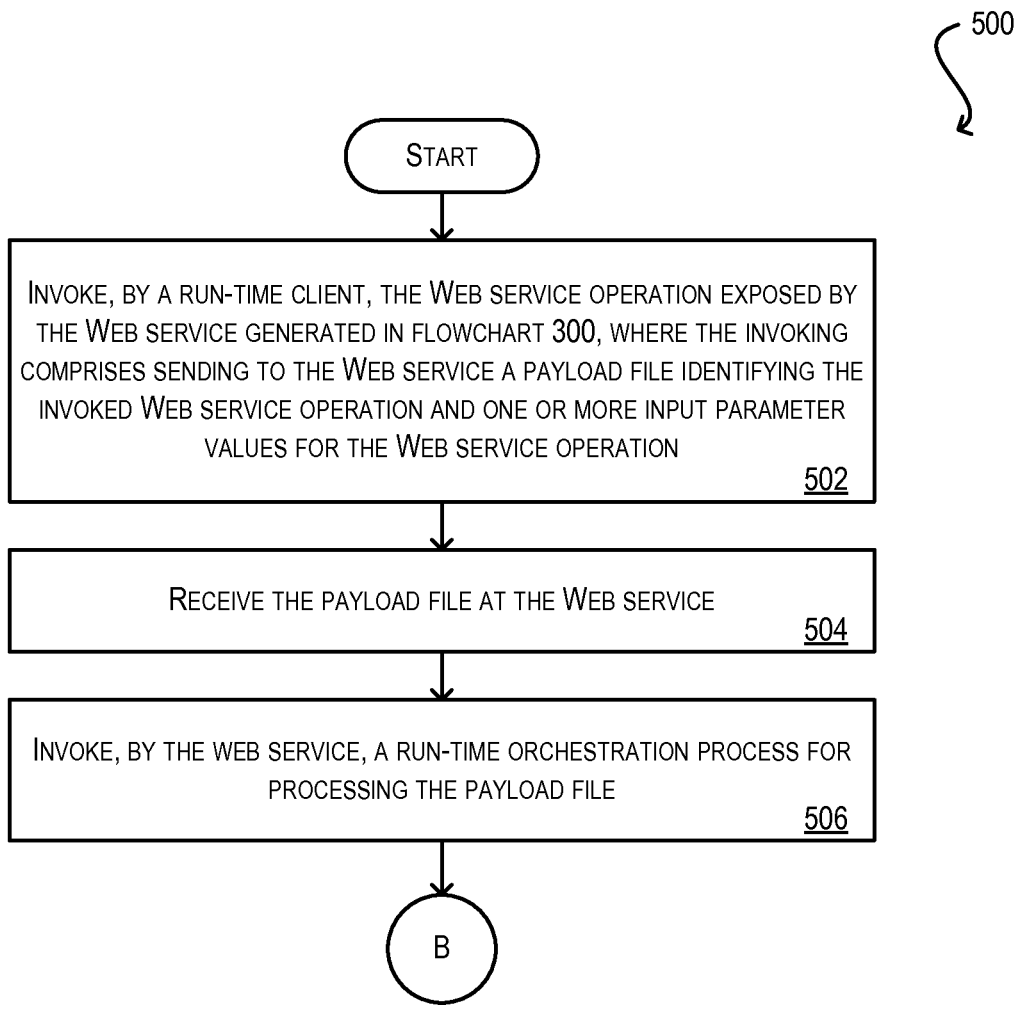
FIGS. 5A and 5B are flowcharts illustrating steps carried out by one or more components of the run-time system of FIG. 4 in accordance with an embodiment of the present invention.
Figure 5B:
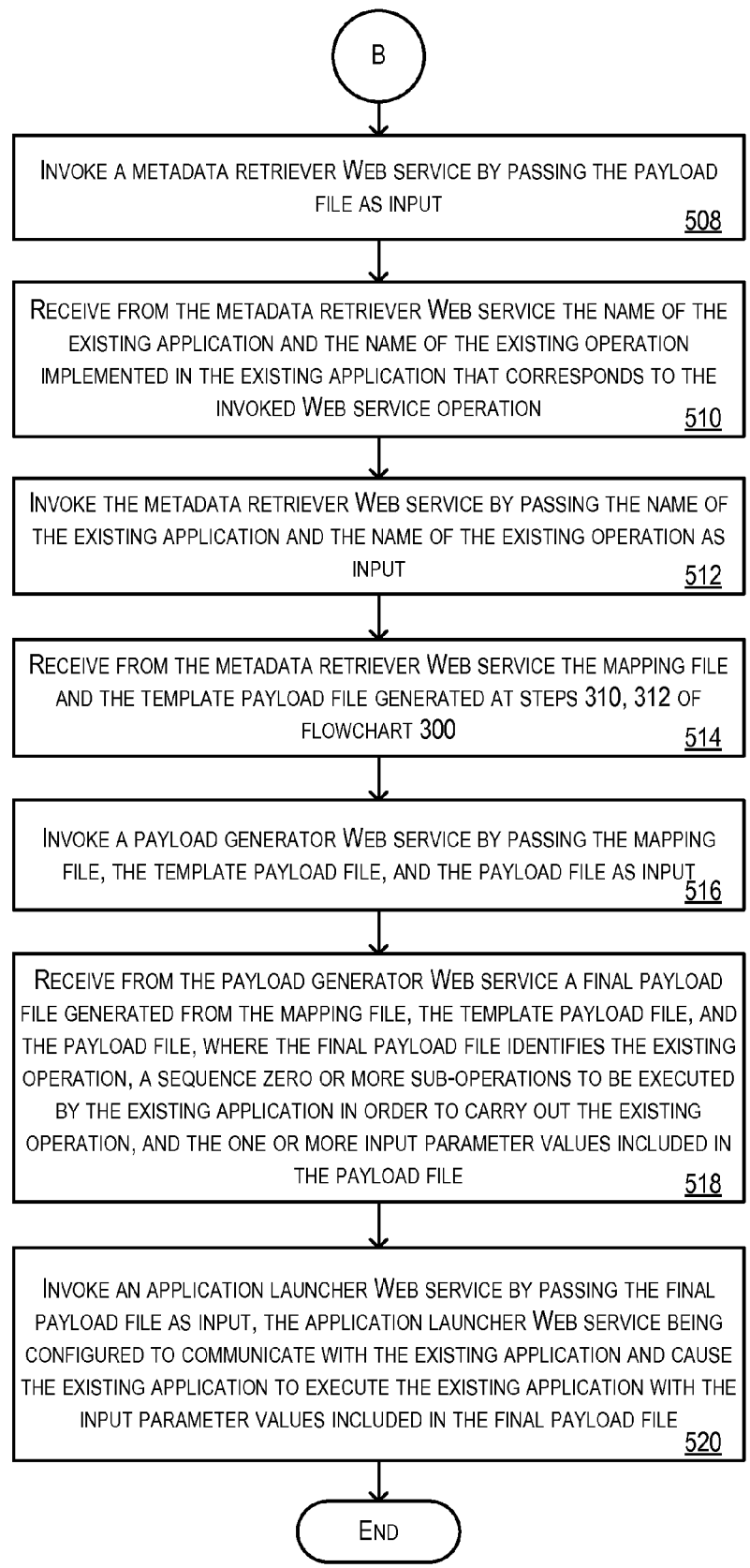

FIGS. 5A and 5B illustrate a flowchart 500 describing a run-time flow for running a Web service that is generated per FIGS. 3A and 3B according to an embodiment of the present invention. In various embodiments, the processing of flowchart 500 may be implemented in software, hardware, or combinations thereof. Further, the processing of flowchart 500 may be encoded as program code stored on a machine-readable medium. In a particular embodiment, the processing of flowchart 500 may be carried out by one or more components of run-time system 400 of FIG. 4.

At step 502, a Web service operation exposed by the Web service generated per flowchart 300 is invoked by a run-time client. In one set of embodiments, this invoking comprises sending to the Web service a payload file identifying the invoked Web service operation and one or more input parameter values for the Web service operation. For example, assume that the run-time client invokes a Web service operation named "WSOperation1" that comprises input parameters "WSParam1" and "WSParam2." In this case, the payload file would include a reference to "WSOperation1" with values for "WSParam1" and "WSParam2" respectively.

At steps 504 and 506, the Web service receives the payload file and passes the file to a run-time orchestration process (e.g., orchestration process 406 of FIG. 4). The orchestration process may be, for example, a Business Process Execution Language (BPEL) process. The orchestration process is configured to process the payload file and call a number of utility Web services to facilitate execution of the invoked operation.

For example, at step 508, the orchestration process invokes a metadata retriever Web service (e.g., service 410 of FIG. 4) and passes the payload file to the metadata retriever Web service as input. In response, the metadata retriever Web service returns to the orchestration process the name of an existing application and an existing operation implemented in the existing application that should be executed based on the payload data (step 510).

At step 512, the orchestration process invokes the metadata retriever Web service a second time and passes the existing application name and existing operation name received at step 510 as input. In response, the metadata retriever Web service returns to the orchestration process the mapping file and template payload file generated for that existing operation at design-time of the Web service (e.g., steps 310, 312 of flowchart 300). Returning to the example above, assume that the Web service operation "WSOperation1" referenced in the payload file corresponds to an existing operation "Operation1" with input parameters "DataObject1" and "DataObject2." In this case, the mapping file would include a first mapping between existing operation "Operation1" and alternative operation name "WSOperation1," a second mapping between the existing data object "DataObject1" and alternative data object name "WSDataObject1," and a third mapping between existing data object "DataObject2" and alternative data object name "WSDataObject2." Further, the template payload file would include an invocation of "Operation1" with null values for input parameters "DataObject1" and "DataObject2" and a sequence of zero or more sub-operations for "Operation1."

At step 516, the run-time orchestration process invokes a payload generator Web service (e.g., service 412 of FIG. 4) and passes the mapping file, the template payload file, and the payload file as input. The payload generator Web service is configured to generate a final payload file based on the mapping, template payload, and payload files, and return the final payload file to the orchestration process (step 518). In various embodiments, the final payload file is generated by using the mapping file to map the alternative names for the existing operation and its associated data objects (used in the payload file) to the actual names for the existing operation and its associated data objects used in the template payload file. The data for input parameter values is then copied from the payload file to the template payload file based on the mappings. Returning to the example above, since the mapping file includes mappings between "Operation1" and "WSOperation1," "DataObject1" and "WSDataObject1,"

and "DataObject2" and "WSDataObject2" respectively, these mappings may be used to copy the value for "WSDataObject1" in the payload file to "DataObject1" in the template payload file, and the value for "WSDataObject2" in the payload file to "DataObject2" in the template payload file. The end result is a final payload file that comprises an invocation of the existing operation implemented in the existing application (e.g., "Operation1"), appropriate data values for the input parameters of the existing operation, and a sequence of zero or more sub-operations for the existing operation.

Once the final payload file is generated and received at the orchestration process, the final payload file is passed to an application launcher Web service (e.g., service 414 of FIG. 4) at step 520. The application launcher Web service is configured to send the final payload file to an instance of the existing application, thereby causing the existing operation referenced in the final payload file to be executed.

Although not shown in flowchart 500, the orchestration process may also receive one or more output parameter values resulting from the execution of the existing operation by the existing application. These output values may be passed back to the generated Web service directly, or may be passed to a response transformation Web service (e.g., service 418 of FIG. 4). In various embodiments, the response transformation Web service is configured to convert the output parameter values into a format appropriate for the generated Web service.

It should be appreciated that the specific steps illustrated in FIGS. 5A and 5B provide a particular method for running a Web service according to embodiments of the present invention. Other sequences of steps may also be performed according to alternative embodiments. For example, individual steps illustrated in FIGS. 5A and 5B may include multiple sub-steps that may be performed in various sequences as appropriate to the individual step. Further, additional steps may be added, or existing steps may be removed, depending on the particular application. One of ordinary skill in the art would recognize many variations, modifications, and alternatives.

Figure 6:
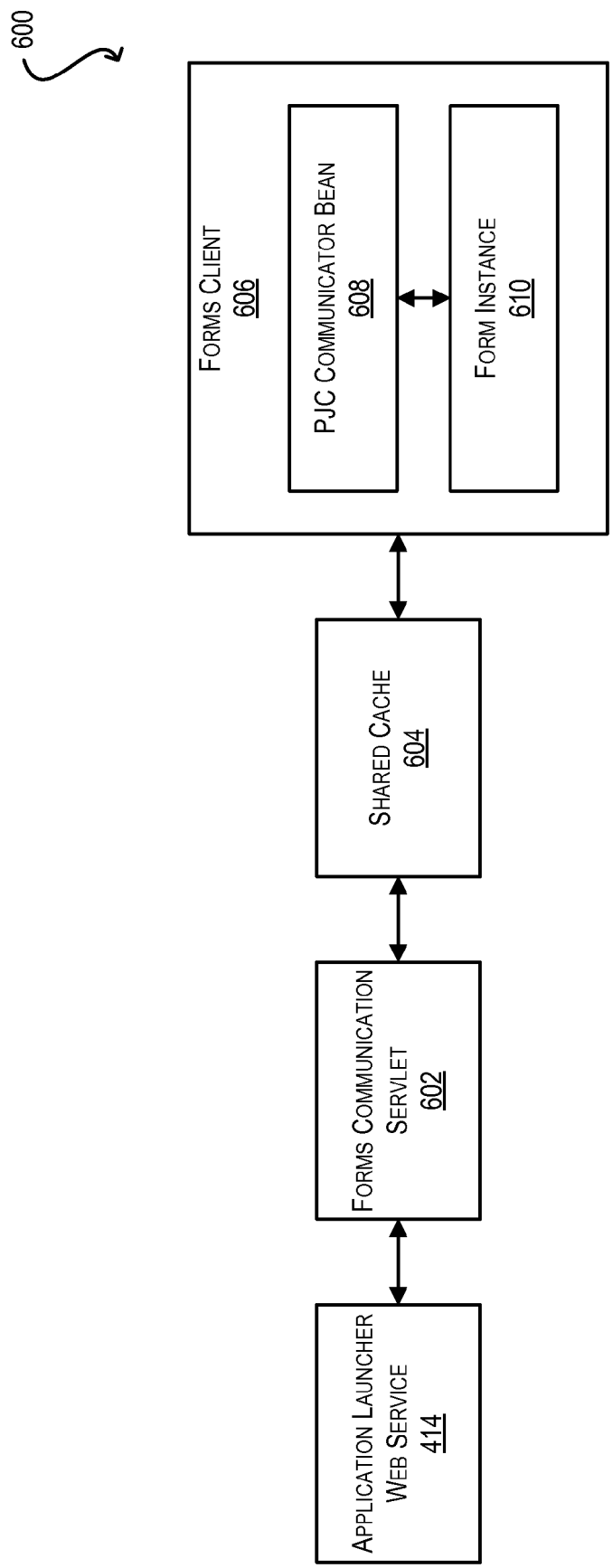
FIG. 6 is a simplified block diagram illustrating a run-time system for facilitating communication between a Web service and a Forms-based application in accordance with an embodiment of the present invention.

FIG. 6 is a simplified block diagram illustrating a system 600 for facilitating communication between a Web service and a Forms-based application in accordance with an embodiment of the present invention. In particular, system 600 may be used at run-time of generated Web service 408 of FIG. 4 to facilitate communication between application launcher Web service 414 and a Forms-based application (e.g., existing application 416). As shown, system 600 comprises a Forms communication servlet 602, a shared cache 604, and a Forms client 606 including a PJC communicator bean 608 and a form instance 610.

Forms communication servlet 602 acts as a lifecycle manager for the Forms-based application. In one set of embodiments, servlet 602 receives a form name, the final payload file generated at step 518 of FIG. 5B, a request type, and a servlet URL from application launcher Web service 414. Servlet 602 then checks the request type and, if the request type is not equal to "ERROR," places the final payload in shared cache 604. Further, servlet 602 starts an instance of Forms client 606 and begins listening on a specific variable (e.g., "isResponseArrived") in the shared cache. This variable is shared between the servlet and Forms client 606 and indicates that the final payload has been processed by Forms client 606.

Once Forms client 606 is started, PJC communicator bean 608 is instantiated. PJC communicator bean 608 is configured to communicate with Forms instance 610 and wait for a response from instance 610 indicating that the operation(s) in the final payload have been executed. When PJC communicator bean 608 receives the response, the bean sets the "isResponseArrived" variable in shared cache 604 to true. Forms communication servlet 602 detects this change in the "isResponseArrived" variable, retrieves a response object from the shared cache, and sends the response object to application launcher Web service 414. Forms communication servlet 602 also closes the instance of Forms client 606.

Figure 7:
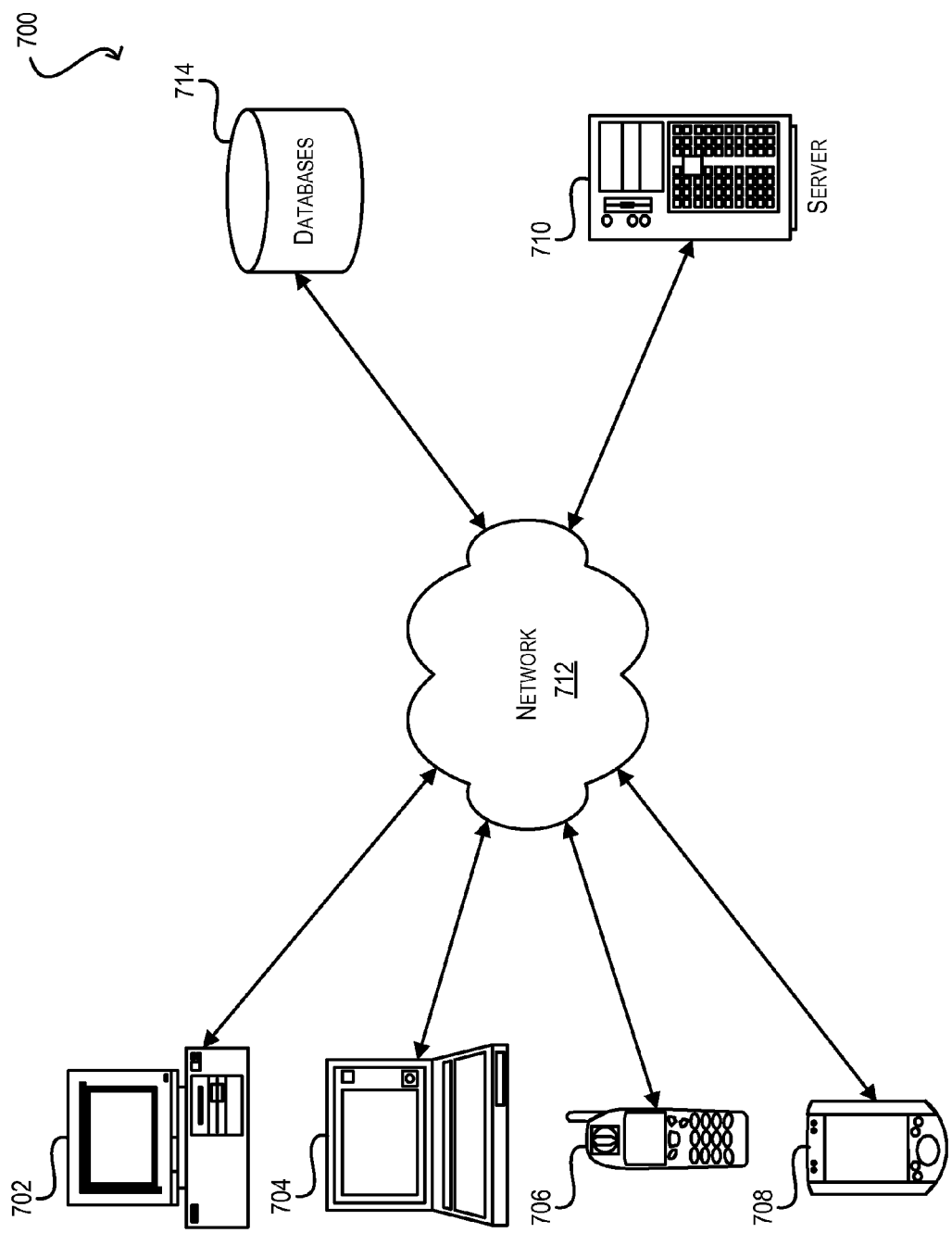
FIG. 7 is a simplified block diagram illustrating a physical system environment that may be used in accordance with an embodiment of the present invention.

FIG. 7 is a simplified block diagram illustrating physical components of a system environment 700 that may be used in accordance with an embodiment of the present invention. As shown, system environment 700 includes one or more client computing devices 702, 704, 706, 708 communicatively coupled with a server computer 710 via a network 712. In one set of embodiments, client computing devices 702, 704, 706, 708 may be configured to run one or more components of a design-time environment (e.g., design-time environment 204 of FIG. 4) for generating a Web service. In another set of embodiments, computing devices 702, 704, 706, 708 may be configured to run a run-time client application (e.g., run-time client 402 of FIG. 4) for invoke a generated Web service.

Client computing devices 702, 704, 706, 708 may be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 may be any other electronic device capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX server, UNIX server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any of a variety of server applications and/or mid-tier applications, including web servers, Java virtual machines, application servers, database servers, and the like. In various embodiments, server computer 710 is adapted to run one or more Web services or software applications described in the foregoing disclosure. For example, server computer 710 may run any of the run-time or design-time components/services depicted in FIGS. 2 and 4.

As shown, client computing devices 702, 704, 706, 708 and server computer 710 are communicatively coupled via network 712. Network 712 may be any type of network that can support data communications using any of a variety of commercially-available protocols, including without limitation TCP/IP, SNA, IPX, AppleTalk, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 may also include one or more databases 714. Database 714 may correspond to an instance of integration repository 214 of FIGS. 2 and 4, as well as any other type of database or data storage component described in this disclosure. Database 714 may reside in a variety of locations. By way of example, database 714 may reside on a storage medium local to (and/or resident in) one or more of the computers 702, 704, 706, 708, 710. Alternatively, database 714 may be remote from any or all of the computers 702, 704, 706, 708, 710 and/or in communication (e.g., via network 712) with one or more of these. In one set of embodiments, database 714 may reside in a storage-area network (SAN) familiar to those skilled in the art. Similarly, any necessary files for performing the functions attributed to the computers 702, 704, 706, 708, 710 may be stored locally on the respective computer and/or remotely on database 714, as appropriate. In one set of embodiments, database 714 is a relational database, such as Oracle 10 g available from Oracle Corporation, that is adapted to store, update, and retrieve data in response to SQL-formatted commands.

Figure 8:
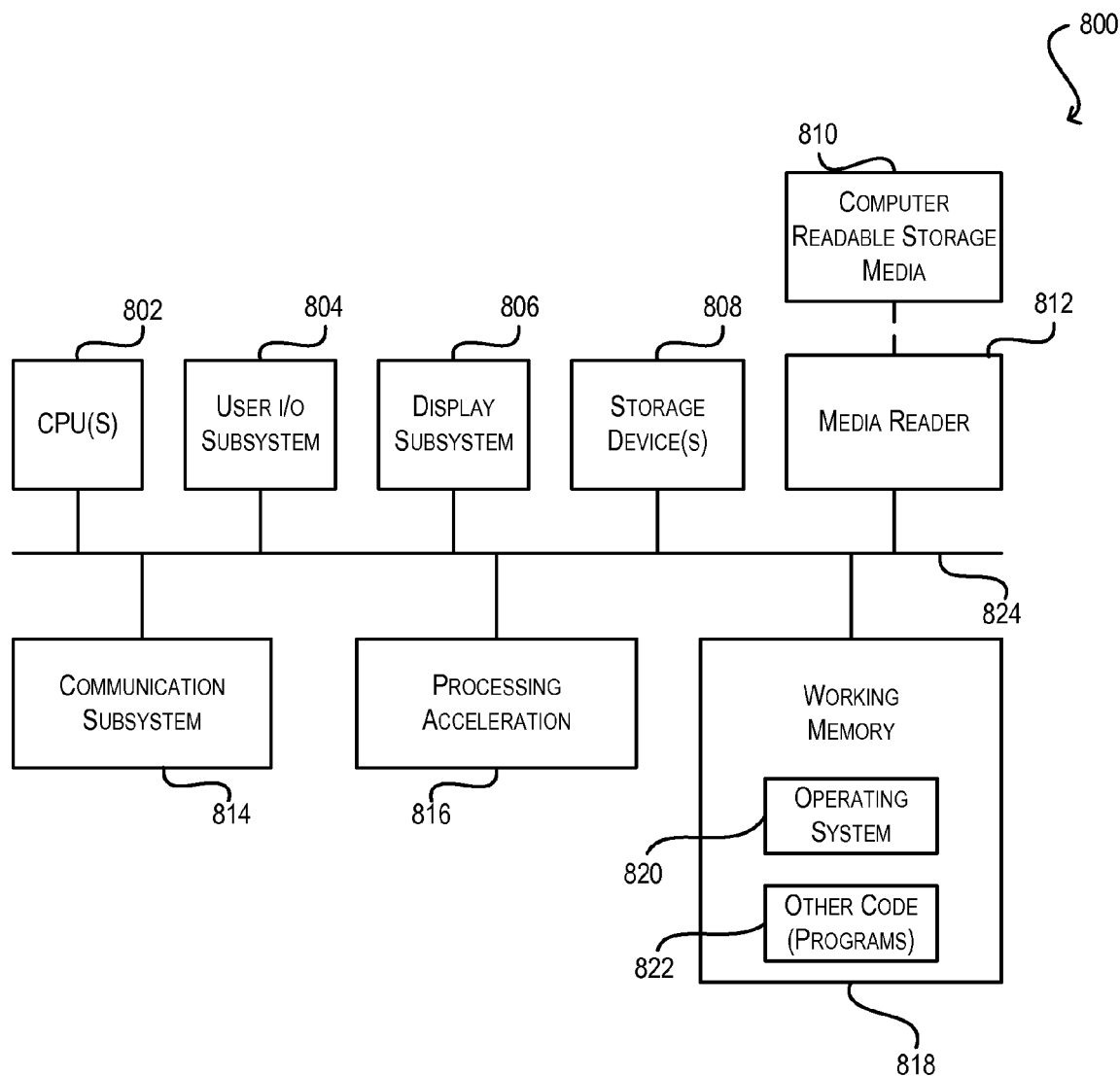
FIG. 8 is a simplified block diagram illustrating a computer system that may be used in accordance with an embodiment of the present invention.

FIG. 8 is a simplified block diagram illustrating physical components of a computer system 800 that may be used in accordance with an embodiment of the present invention. In various embodiments, computer system 800 may be used to implement any of the computers 702, 704, 706, 708, 710 illustrated in system environment 700 described above. As shown in FIG. 8, computer system 800 comprises hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). Computer system 800 may also include one or more storage devices 808. By way of example, storage device(s) 808 may include devices such as disk drives, optical storage devices, and solid-state storage devices such as a random access memory (RAM) and/or a read-only memory (ROM), which can be programmable, flash-updateable and/or the like.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable code and associated data structures for one or more of the design-time or runtime components/services illustrated in FIGS. 2 and 4. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed.

In one set of embodiments, the techniques described herein may be implemented as program code executable by a computer system (such as a computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. For example, while embodiments of the present invention have been described in the context of generating Web services based on Forms or OAF-based applications, it should be appreciated that the techniques described herein may be applied to generate Web services based on any type of existing application built using any type of application technology.

Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for facilitating reuse of logic implemented in an existing software application, the method comprising:
receiving, at a computer system configured to run a Web service, a payload file representing an invocation of a Web service operation that causes an existing operation implemented in an existing software application to be executed, the payload file including one or more input parameter values; and
invoking, at the computer system, an orchestration process configured to:

invoke a set of one or more utility Web services to facilitate execution of the Web service operation;

cause generation of a final payload file based at least in part on the payload file, the final payload file identifying the existing operation, a sequence of sub-operations to be performed by the existing software application in order to carry out the existing operation, and the one or more input parameter values; and communicate with the existing software application and cause the existing software application to execute the existing operation based at least in part on the final payload file;

wherein at least one utility Web service of the set of one or more utility Web services is invoked based at least in part on a mapping between the existing operation and an alternative operation name.

2. The method for facilitating reuse of logic implemented in the existing software application of claim 1, wherein the set of one or more utility Web services comprises a first utility Web service, and the orchestration process is further configured to:

invoke the first utility Web service by passing the payload file as input;

receive from the first utility Web service a name of the existing software application and a name of the existing operation; and invoke the first utility Web service by passing the name of the existing software application and the name of the existing operation as input.

3. The method for facilitating reuse of logic implemented in the existing software application of claim 2, the orchestration process being further configured to:

receive from the first utility Web service a mapping file and a template payload file, wherein:

the mapping file identifies the existing operation, its associated data objects, and the mapping between the existing operation and the alternative operation name; and the template payload file defines a template payload to be transmitted to the existing software application at a time of invocation of the Web service operation, the template payload including an invocation of the existing operation, one or more placeholder values for one or more input parameters, and the sequence of sub-operations to be executed by the existing software application in order to carry out the existing operation.

4. The method for facilitating reuse of logic implemented in the existing software application of claim 3, wherein the set of one or more utility Web services comprises a second utility Web service, and the orchestration process is further configured to:

invoke the second utility Web service by passing the mapping file, the template payload file, and the payload file as input; and receive from the second utility Web service the final payload file generated based on the mapping file, the template payload file, and the payload file.

5. The method for facilitating reuse of logic implemented in the existing software application of claim 4, wherein the set of one or more utility Web services comprises a third utility Web service, and the orchestration process is further configured to:

invoke the third utility Web service by passing the final payload file as input, the third utility Web service being configured to communicate with the existing software application and cause the existing software application to execute the existing operation.

6. The method for facilitating reuse of logic implemented in the existing software application of claim 5, wherein the set of one or more utility Web services comprises a fourth utility Web service, and the orchestration process is further configured to:

receive, from the third utility Web service, one or more output parameter values outputted by the existing operation;

invoke the fourth utility Web service by passing the one or more output parameter values as input, the fourth utility Web service being configured to transform a format of the one or more output parameter values into a format understood by the Web service to result in one or more transformed output parameter values;

receive the one or more transformed output parameter values; and pass the one or more transformed output parameter values to the Web service.

7. The method for facilitating reuse of logic implemented in the existing software application of claim 1, wherein the existing software application is built using an application technology that is not Web service-enabled, the computer system is a first computer system in a run-time environment, and the payload file is from a second computer system in a design-time environment.

8. The method for facilitating reuse of logic implemented in the existing software application of claim 1, wherein the orchestration process comprises a Business Process Execution Language (BPEL) process.

9. A system to facilitate reuse of logic implemented in an existing software application, the system comprising:

a first computer system configured to run a Web service, the first computer system comprising one or more processors to execute instructions to:

receive a payload file representing an invocation of a Web service operation that causes an existing operation implemented in an existing software application to be executed, the payload file including one or more input parameter values; and invoke an orchestration process configured to:

invoke a set of one or more utility Web services to facilitate execution of the Web service operation;

cause generation of a final payload file based at least in part on the payload file, the final payload file identifying the existing operation, a sequence of sub-operations to be performed by the existing software application in order to carry out the existing operation, and the one or more input parameter values; and communicate with the existing software application and cause the existing software application to execute the existing operation based at least in part on the final payload file;

wherein at least one utility Web service of the set of one or more utility Web services is invoked based at least in part on a mapping between the existing operation and an alternative operation name.

10. The system to facilitate the reuse of logic implemented in the existing software application of claim 9, wherein the set of one or more utility Web services comprises a first utility Web service, and the orchestration process is further configured to:

invoke the first utility Web service by passing the payload file as input;

receive from the first utility Web service a name of the existing software application and a name of the existing operation; and invoke the first utility Web service by passing the name of the existing software application and the name of the existing operation as input.

11. The system to facilitate the reuse of logic implemented in the existing software application of claim 10, the orchestration process being further configured to:

receive from the first utility Web service a mapping file and a template payload file, wherein:

the mapping file identifies the existing operation, its associated data objects, and the mapping between the existing operation and the alternative operation name; and the template payload file defines a template payload to be transmitted to the existing software application at a time of invocation of the Web service operation, the template payload including an invocation of the existing operation, one or more placeholder values for one or more input parameters, and the sequence of sub-operations to be executed by the existing software application in order to carry out the existing operation.

12. The system to facilitate the reuse of logic implemented in the existing software application of claim 11, wherein the set of one or more utility Web services comprises a second utility Web service, and the orchestration process is further configured to:

invoke the second utility Web service by passing the mapping file, the template payload file, and the payload file as input; and receive from the second utility Web service the final payload file generated based on the mapping file, the template payload file, and the payload file.

13. The system to facilitate the reuse of logic implemented in the existing software application of claim 12, wherein the set of one or more utility Web services comprises a third utility Web service, and the orchestration process is further configured to:

invoke the third utility Web service by passing the final payload file as input, the third utility Web service being configured to communicate with the existing software application and cause the existing software application to execute the existing operation.

14. The system to facilitate the reuse of logic implemented in the existing software application of claim 13, wherein the set of one or more utility Web services comprises a fourth utility Web service, and the orchestration process is further configured to:

receive, from the third utility Web service, one or more output parameter values outputted by the existing operation;

invoke the fourth utility Web service by passing the one or more output parameter values as input, the fourth utility Web service being configured to transform a format of the one or more output parameter values into a format understood by the Web service to result in one or more transformed output parameter values;

receive the one or more transformed output parameter values; and pass the one or more transformed output parameter values to the Web service.

15. The system to facilitate the reuse of logic implemented in the existing software application of claim 9, wherein the existing software application is built using an application technology that is not Web service-enabled, the first computer system is in a run-time environment, and the payload file is from a second computer system in a design-time environment.

16. The system to facilitate the reuse of logic implemented in the existing software application of claim 9, wherein the orchestration process comprises a Business Process Execution Language (BPEL) process.

17. One or more non-transitory, machine-readable media having machine-readable instructions thereon to facilitate reuse of logic implemented in an existing software application, which instructions, when executed by one or more computers or other processing devices, cause the one or more computers or other processing devices to:

receive a payload file representing an invocation of a Web service operation that causes an existing operation implemented in an existing software application to be executed, the payload file including one or more input parameter values; and invoke an orchestration process configured to:

invoke a set of one or more utility Web services to facilitate execution of the Web service operation;

cause generation of a final payload file based at least in part on the payload file, the final payload file identifying the existing operation, a sequence of sub-operations to be performed by the existing software application in order to carry out the existing operation, and the one or more input parameter values; and communicate with the existing software application and cause the existing software application to execute the existing operation based at least in part on the final payload file;

wherein at least one utility Web service of the set of one or more utility Web services is invoked based at least in part on a mapping between the existing operation and an alternative operation name.

18. The one or more non-transitory, machine-readable media of claim 17, wherein the set of one or more utility Web services comprises a first utility Web service, and the orchestration process is further configured to:

invoke the first utility Web service by passing the payload file as input;

receive from the first utility Web service a name of the existing software application and a name of the existing operation; and invoke the first utility Web service by passing the name of the existing software application and the name of the existing operation as input.

19. The one or more non-transitory, machine-readable media of claim 18, the orchestration process being further configured to:

receive from the first utility Web service a mapping file and a template payload file, wherein:

the mapping file identifies the existing operation, its associated data objects, and the mapping between the existing operation and the alternative operation name; and the template payload file defines a template payload to be transmitted to the existing software application at a time of invocation of the Web service operation, the template payload including an invocation of the existing operation, one or more placeholder values for one or more input parameters, and the sequence of sub-operations to be executed by the existing software application in order to carry out the existing operation.

20. The one or more non-transitory, machine-readable media of claim 19, wherein the set of one or more utility Web services comprises a second utility Web service, and the orchestration process is further configured to:
  invoke the second utility Web service by passing the mapping file, the template payload file, and the payload file as input; and
  receive from the second utility Web service the final payload file generated based on the mapping file, the template payload file, and the payload file.

\* \* \* \* \*

UNITED STATES PATENT AND TRADEMARK OFFICE
CERTIFICATE OF CORRECTION

Page 1 of 1

PATENT NO. : 9,606,778 B2
APPLICATION NO. : 14/313514
DATED : March 28, 2017
INVENTOR(S) : Srinivasan et al.

It is certified that error appears in the above-identified patent and that said Letters Patent is hereby corrected as shown below:

On the Title Page

Column 2, under Other Publications, Line 2, delete "IEE" and insert -- IEEE --, therefor.

On page 4, Column 1, under Other Publications, Line 61, delete "Exodus®" and insert -- Exodus™ --, therefor.

On page 6, Column 1, under Other Publications, Line 16, delete "-the thebad" and insert -- -thebad --, therefor.

In the Drawings

On sheet 1 of 10, in FIG. 1, under Reference Numeral 106, Line 1, after "BASED" insert -- ON --.

In the Specification

In Column 11, Line 52, delete "an\" and insert -- an --, therefor.

In Column 15, Line 24, delete "10 g" and insert -- 10g --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*